United States Patent
Huang et al.

(10) Patent No.: US 10,921,496 B2
(45) Date of Patent: Feb. 16, 2021

(54) OPTICAL IMAGE LENS ASSEMBLY, IMAGING APPARATUS AND ELECTRONIC DEVICE

(71) Applicant: LARGAN PRECISION CO., LTD., Taichung (TW)

(72) Inventors: Yeo-Chih Huang, Taichung (TW); Pei-Chi Chang, Taichung (TW); Chun-Hung Teng, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 44 days.

(21) Appl. No.: 16/378,709

(22) Filed: Apr. 9, 2019

(65) Prior Publication Data

US 2019/0317253 A1    Oct. 17, 2019

Related U.S. Application Data

(60) Provisional application No. 62/655,863, filed on Apr. 11, 2018.

(30) Foreign Application Priority Data

Mar. 29, 2019    (TW) .................................. 108111397

(51) Int. Cl.
| | | |
|---|---|---|
| *G02B 3/02* | (2006.01) | |
| *G02B 5/22* | (2006.01) | |
| *G02B 5/00* | (2006.01) | |
| *G02B 9/62* | (2006.01) | |
| *G02B 9/60* | (2006.01) | |
| *G02B 13/00* | (2006.01) | |

(52) U.S. Cl.
CPC .............. *G02B 5/003* (2013.01); *G02B 9/60* (2013.01); *G02B 9/62* (2013.01); *G02B 13/0045* (2013.01)

(58) Field of Classification Search
CPC ...................................................... G02B 5/003
See application file for complete search history.

(56) References Cited

U.S. PATENT DOCUMENTS

| | | | | |
|---|---|---|---|---|
| 9,341,815 B1* | 5/2016 | Hsueh | .................. | G02B 13/008 |
| 2013/0301136 A1* | 11/2013 | Lin | .................... | G02B 13/0035 |
| | | | | 359/601 |
| 2018/0067231 A1* | 3/2018 | Chang | .................... | G02B 1/041 |
| 2018/0231739 A1* | 8/2018 | Bone | .................. | G02B 13/0045 |

* cited by examiner

*Primary Examiner* — Darryl J Collins
(74) *Attorney, Agent, or Firm* — McClure, Qualey & Rodack, LLP

(57) ABSTRACT

An optical image lens assembly includes a plurality of optical lens elements. The optical lens elements include a plurality of plastic optical lens elements having refractive power and aspheric surfaces. The plastic optical lens elements are formed by an injection molding method and include at least one defined-wavelength light absorbing optical lens element, and the defined-wavelength light absorbing optical lens element includes at least one defined-wavelength light absorbent.

24 Claims, 9 Drawing Sheets

OPTICAL IMAGE LENS ASSEMBLY, IMAGING APPARATUS AND ELECTRONIC DEVICE

RELATED APPLICATIONS

This application claims priority to U.S. Provisional Application Ser. No. 62/655,863, filed Apr. 11, 2018, and Taiwan Application Serial Number 108111397, filed Mar. 29, 2019, which are herein incorporated by reference.

BACKGROUND

Technical Field

The present disclosure relates to an optical image lens assembly and an image capturing apparatus. More particularly, the present disclosure relates to a compact optical image lens assembly and an image capturing apparatus which include a plastic optical lens element capable of absorbing a defined-wavelength light and are applicable to electronic devices.

Description of Related Art

Conventional color image sensors can respond to the visible light, the long-wavelength red light of 650 nm-700 nm and the infrared light of 700 nm-1000 nm. Thus, the color saturation is poor and the image color will be distorted.

In conventional arts, the blue glass filter (that is, the infrared cut-off plate) is used so as to filter out the long-wavelength red light. However, the infrared light cannot be sufficiently filtered due to the limitation of the materials and the high cost of the blue glass. Furthermore, because a thickness of the light cut-off plate is large, a back focal length of the lens assembly is elongated. Thus, it is not favorable for the miniaturization of the lens assembly with high image quality.

Furthermore, in order to satisfy the demands of miniaturization, manufacturing of aspheric surface and mass production of the multi-lens assembly with high image quality, the lens elements thereof are made of plastic materials. However, it is hard to prevent the lens element made of a plastic material from the damage caused by UV light or blue light. Thus, the durability and image quality thereof are decreased. Moreover, although the conventional coating thereon can reflect UV light, the cost of the coating is high and the uniformity thereof is still a problem.

SUMMARY

According to one aspect of the present disclosure, an optical image lens assembly includes a plurality of optical lens elements. The optical lens elements include a plurality of plastic optical lens elements having refractive power and aspheric surfaces. The plastic optical lens elements are formed by an injection molding method and include at least one defined-wavelength light absorbing optical lens element, and the defined-wavelength light absorbing optical lens element includes at least one defined-wavelength light absorbent. The defined-wavelength light absorbing optical lens element has an average transmittance larger than 50% in a green visible light region, and the defined-wavelength light absorbing optical lens element has an average transmittance smaller than 50% in a defined-wavelength region. When a transmitted distance of a chief ray passing through the defined-wavelength light absorbing optical lens element between a central field of view to a field of view in 1.0 region in an imaging region of the optical image lens assembly is CP, and a transmitted distance of the chief ray passing through the defined-wavelength light absorbing optical lens element in the central field of the optical image lens assembly is CP0, the following condition is satisfied:

$$0.5 \leq CP/CP0 \leq 2.0.$$

According to another aspect of the present disclosure, an image capturing apparatus includes the optical image lens assembly according to the aforementioned aspect and an image sensor, wherein the image sensor is disposed on an image plane of the optical image lens assembly.

According to further another aspect of the present disclosure, an electronic device, which is a mobile device, includes the image capturing apparatus according to the aforementioned aspect.

According to still another aspect of the present disclosure, an optical image lens assembly includes a plurality of optical lens elements. The optical lens elements include a plurality of plastic optical lens elements having refractive power and aspheric surfaces. The plastic optical lens elements are formed by an injection molding method and include at least one defined-wavelength light absorbing optical lens element, and the defined-wavelength light absorbing optical lens element includes at least one defined-wavelength light absorbent. The defined-wavelength light absorbing optical lens element has an average transmittance larger than 50% in at least one of a blue visible light region, a green visible light region and a red visible light region. The defined-wavelength light absorbing optical lens element has an average transmittance smaller than 70% in a defined-wavelength region, and a bandwidth having a transmittance smaller than 70% of the defined-wavelength light absorbing optical lens element is smaller than 200 nm. When a transmitted distance of a chief ray passing through the defined-wavelength light absorbing optical lens element between a central field of view to a field of view in 1.0 region in an imaging region of the optical image lens assembly is CP, and a transmitted distance of the chief ray passing through the defined-wavelength light absorbing optical lens element in the central field of the optical image lens assembly is CP0, the following condition is satisfied:

$$0.8 \leq CP/CP0 \leq 1.2.$$

According to yet another aspect of the present disclosure, an image capturing apparatus includes the optical image lens assembly according to the aforementioned aspect and an image sensor, wherein the image sensor is disposed on an image plane of the optical image lens assembly.

According to more another aspect of the present disclosure, an electronic device, which is a mobile device, includes the image capturing apparatus according to the aforementioned aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
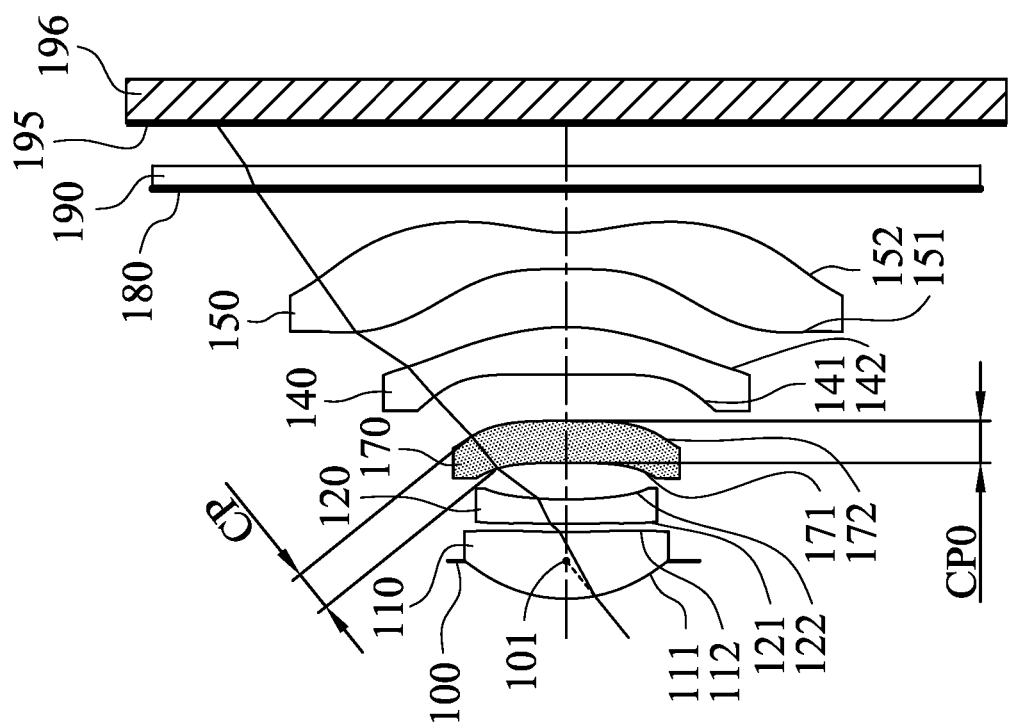
FIG. 1 is a schematic view of an image capturing apparatus according to the 1st embodiment of the present disclosure.

The present disclosure provides an optical image lens assembly including a plurality of optical lens elements, wherein the optical lens elements include a plurality of plastic optical lens elements having refractive power and aspheric surfaces. The plastic optical lens elements are formed by an injection molding method and include at least one defined-wavelength light absorbing optical lens element, and the defined-wavelength light absorbing optical lens element includes at least one defined-wavelength light absorbent.

In the optical image lens assembly according to the present disclosure, wherein the defined-wavelength light absorbing optical lens element has an average transmittance larger than 50% in a green visible light region, and the defined-wavelength light absorbing optical lens element has an average transmittance smaller than 50% in a defined-wavelength region. The following condition is satisfied: $0.5 \leq CP/CP0 \leq 2.0$, wherein a transmitted distance of a chief ray passing through the defined-wavelength light absorbing optical lens element between a central field of view to a field of view in 1.0 region in an imaging region of the optical image lens assembly is CP, and a transmitted distance of the chief ray passing through the defined-wavelength light absorbing optical lens element in the central field of the optical image lens assembly is CP0. Therefore, when a chief ray of each of the field of views satisfies the aforementioned condition, it is favorable for enhancing the color realism of image. By contrast, when the CP/CP0 is less than a lower limit of the aforementioned condition, the color saturation thereof will decrease, and when the CP/CP0 is greater than the upper limit of the aforementioned condition, the color shift in the off-axial field thereof will happen. Furthermore, the following condition can be satisfied: $0.8 \leq CP/CP0 \leq 1.2$. Therefore, a wavelength having an average transmittance equal to 50% of the defined-wavelength light absorbing optical lens element can be restricted within a proper range, so that the inhibition efficiency of color shift thereof is better than the light cut-off plate. Accordingly, a more favorable degree of change of CP/CP0 can be obtained, and the color shift in the peripheral region thereof can be avoided.

In the optical image lens assembly according to the present disclosure, wherein the defined-wavelength light absorbing optical lens element has an average transmittance larger than 50% in at least one of a blue visible light region, a green visible light region and a red visible light region. The defined-wavelength light absorbing optical lens element has an average transmittance smaller than 70% in a defined-wavelength region, and a bandwidth having a transmittance smaller than 70% of the defined-wavelength light absorbing optical lens element is smaller than 200 nm. The following condition is satisfied: $0.8 \leq CP/CP0 \leq 1.2$, wherein the transmitted distance of the chief ray passing through the defined-wavelength light absorbing optical lens element between the central field of view to the field of view in 1.0 region in the imaging region of the optical image lens assembly is CP, and the transmitted distance of the chief ray passing through the defined-wavelength light absorbing optical lens element in the central field of the optical image lens assembly is CP0. Therefore, when a chief ray of each of the field of views satisfies the aforementioned condition, it is favorable for enhancing the color contrast and reducing interference caused by interference lights of a non-target wavelength region. Thus, the local color saturation can be enhanced and the color shift in the off-axis field can be reduced.

In the optical image lens assembly according to the present disclosure, wherein the defined-wavelength light absorbing optical lens element can be made of a thermoplastic material. When an average transmittance in a wavelength range of 380 nm-430 nm of all of the defined-wavelength light absorbing optical lens elements is T3843, and an average transmittance in a wavelength range of 520 nm-570 nm of all of the defined-wavelength light absorbing optical lens elements is T5257, the following conditions can be satisfied: $T3843 \leq 50\%$; and $T5257 \geq 85\%$. Therefore, the optical image lens assembly of the present disclosure has an ability to absorb short-wavelength lights. Accordingly, the durability thereof can be effectively enhanced, and the high image quality of the optical image lens assembly can be maintained.

In the optical image lens assembly according to the present disclosure, when an average transmittance in a wavelength range of 200 nm-300 nm of all of the defined-wavelength light absorbing optical lens elements is T2030, the following condition can be satisfied: $0\% \leq T2030 \leq 60\%$. Therefore, it is favorable for enhancing the durability of the optical lens elements. Furthermore, the following condition can be satisfied: $0\% \leq T2030 \leq 50\%$. Furthermore, the following condition can be satisfied: $0\% \leq T2030 \leq 25\%$. Furthermore, the following condition can be satisfied: $0\% \leq T2030 \leq 10\%$. Furthermore, the following condition can be satisfied: $0\% \leq T2030 \leq 5\%$.

In the optical image lens assembly according to the present disclosure, when an average transmittance in a wavelength range of 250 nm-350 nm of all of the defined-wavelength light absorbing optical lens elements is T2535, the following condition can be satisfied: $0\% \leq T2535 \leq 50\%$. Therefore, it is favorable for enhancing the durability of the optical lens elements. Furthermore, the following condition can be satisfied: $0\% \leq T2535 \leq 25\%$. Furthermore, the following condition can be satisfied: $0\% \leq T2535 \leq 10\%$. Furthermore, the following condition can be satisfied: $0\% \leq T2535 \leq 5\%$.

In the optical image lens assembly according to the present disclosure, when an average transmittance in a wavelength range of 300 nm-400 nm of all of the defined-wavelength light absorbing optical lens elements is T3040, the following condition can be satisfied: $0\% \leq T3040 \leq 50\%$. Therefore, it is favorable for enhancing the durability of the optical lens elements. Furthermore, the following condition can be satisfied: $0\% \leq T3040 \leq 40\%$. Furthermore, the following condition can be satisfied: $0\% \leq T3040 \leq 25\%$. Furthermore, the following condition can be satisfied: $0\% \leq T3040 \leq 10\%$. Furthermore, the following condition can be satisfied: $0\% \leq T3040 \leq 5\%$.

In the optical image lens assembly according to the present disclosure, when an average transmittance in a wavelength range of 300 nm-450 nm of all of the defined-wavelength light absorbing optical lens elements is T3045, the following condition can be satisfied: 0%≤T3045≤60%. Therefore, it is favorable for enhancing the durability of the optical lens elements and maintaining the image quality thereof. Furthermore, the following condition can be satisfied: 0%≤T3045≤40%. Furthermore, the following condition can be satisfied: 0%≤T3045≤20%. Furthermore, the following condition can be satisfied: 0%≤T3045≤10%.

In the optical image lens assembly according to the present disclosure, when an average transmittance in a wavelength range of 350 nm-450 nm of all of the defined-wavelength light absorbing optical lens elements is T3545, the following condition can be satisfied: 0%≤T3545≤60%. Therefore, it is favorable for enhancing the durability of the optical lens elements and maintaining the image quality thereof. Furthermore, the following condition can be satisfied: 0%≤T3545≤40%. Furthermore, the following condition can be satisfied: 0%≤T3545≤20%. Furthermore, the following condition can be satisfied: 0%≤T3545≤10%.

In the optical image lens assembly according to the present disclosure, when the average transmittance in a wavelength range of 380 nm-430 nm of all of the defined-wavelength light absorbing optical lens elements is T3843, the following condition can be satisfied: 0%≤T3843≤70%. Therefore, it is favorable for enhancing the durability and maintaining the image quality. Furthermore, the following condition can be satisfied: 0%≤T3843≤40%. Furthermore, the following condition can be satisfied: 0%≤T3843≤30%. Furthermore, the following condition can be satisfied: 0%≤T3843≤20%. Furthermore, the following condition can be satisfied: 0%≤T3843≤10%.

In the optical image lens assembly according to the present disclosure, when an average transmittance in a wavelength range of 400 nm-500 nm of all of the defined-wavelength light absorbing optical lens elements is T4050, the following condition can be satisfied: 0%≤T4050≤90%. Therefore, it is favorable for maintaining the color realism of image. Furthermore, the following condition can be satisfied: 0%≤T4050≤80%. Furthermore, the following condition can be satisfied: 0%≤T4050≤60%. Furthermore, the following condition can be satisfied: 0%≤T4050≤50%.

In the optical image lens assembly according to the present disclosure, when an average transmittance in a wavelength range of 450 nm-600 nm of all of the defined-wavelength light absorbing optical lens elements is T4560, the following condition can be satisfied: 0%≤T4560≤90%. Therefore, it is favorable for maintaining the color realism of image.

In the optical image lens assembly according to the present disclosure, when the average transmittance in a wavelength range of 520 nm-570 nm of all of the defined-wavelength light absorbing optical lens elements is T5257, the following condition can be satisfied: T5257≥80%. Therefore, it is favorable for maintaining the color realism of image. Furthermore, the following condition can be satisfied: T5257≥90%.

In the optical image lens assembly according to the present disclosure, when an average transmittance in a wavelength range of 650 nm-700 nm of all of the defined-wavelength light absorbing optical lens elements is T6570, the following condition can be satisfied: 0%≤T6570≤50%. Therefore, it is favorable for maintaining the color realism of image. Furthermore, the following condition can be satisfied: 0%≤T6570≤25%.

In the optical image lens assembly according to the present disclosure, when an average transmittance in a wavelength range of 670 nm-710 nm of all of the defined-wavelength light absorbing optical lens elements is T6771, the following condition can be satisfied: 0%≤T6771≤50%. Therefore, it is favorable for maintaining the color realism of image. Furthermore, the following condition can be satisfied: 0%≤T6771≤25%. Furthermore, the following condition can be satisfied: 0%≤T6771≤10%.

In the optical image lens assembly according to the present disclosure, wherein the defined-wavelength light absorbent (the defined-wavelength light absorbent can be classified into a long-wavelength light absorbent and a short-wavelength light absorbent) can be an organic material or an organometallic compound and can be a commercially available product suitable for being applied as a thermoplastic plastic material, such as Goyenchem-BL430 of GYC Group, NIR Absorb Materials for Plastic (Thermal Resin) series of QCR Solutions Corp or other similar products or products in the same level from other suppliers.

In the optical image lens assembly according to the present disclosure, when a central thickness of the defined-wavelength light absorbing optical lens element is less than 2 mm, a weight ratio of the defined-wavelength light absorbent contained in the defined-wavelength light absorbing optical lens element is usually less than 1% based on a weight ratio of the defined-wavelength light absorbing optical lens element as 100%.

In the optical image lens assembly according to the present disclosure, when an Abbe number of the defined-wavelength light absorbing optical lens element is V, the following condition can be satisfied: 50.0≤V. Therefore, it is favorable for enhancing the manufacturing stability and the molding precision of the defined-wavelength light absorbing optical lens element by selecting a suitable plastic material.

In the optical image lens assembly according to the present disclosure, when a wavelength having a 50% transmittance and an increasing trend in a wavelength range of 300 nm-500 nm of the defined-wavelength light absorbing optical lens element is SWuT50, the following condition can be satisfied: 400 nm≤SWuT50. Therefore, the defined-wavelength light absorbing optical lens element can eliminate UV light and blue light simultaneously, and it is favorable for enhancing the durability of the defined-wavelength light absorbing optical lens element. Furthermore, the following condition can be satisfied: 380 nm≤SWuT50≤460. Furthermore, the following condition can be satisfied: 390 nm≤SWuT50≤450.

In the optical image lens assembly according to the present disclosure, when a maximum absorbance in a wavelength range of 300 nm-500 nm of the defined-wavelength light absorbing optical lens element is A3050Mx, and a minimum absorbance in a wavelength range of 400 nm-700 nm of the defined-wavelength light absorbing optical lens element is A4070Mn, the following condition can be satisfied: A3050Mx/A4070Mn≥30. Therefore, it is favorable for enhancing the absorbing effectivity to short-wavelength light and preventing image defects.

In the optical image lens assembly according to the present disclosure, when the minimum absorbance in a wavelength range of 400 nm-700 nm of the defined-wavelength light absorbing optical lens element is A4070Mn, the following condition can be satisfied: A4070Mn≤0.1. Furthermore, the following condition can be satisfied: A4070Mn≤0.05.

In the optical image lens assembly according to the present disclosure, when the minimum absorbance in a wavelength range of 400 nm-700 nm of the defined-wavelength light absorbing optical lens element is A4070Mn, and the maximum absorbance in a wavelength range of 300 nm-500 nm of the defined-wavelength light absorbing optical lens element is A3050Mx, the following condition can be satisfied: $0 \leq 100 \times (A4070Mn/A3050Mx) \leq 10$. Therefore, it is favorable for maintaining the color realism of image and enhancing the durability of the optical lens elements. Furthermore, the following condition can be satisfied: $0 \leq 100 \times (A4070Mn/A3050Mx) \leq 5$. Furthermore, the following condition can be satisfied: $0 \leq 100 \times (A4070Mn/A3050Mx) \leq 2$. Furthermore, the following condition can be satisfied: $0 \leq 100 \times (A4070Mn/A3050Mx) \leq 1.75$. Furthermore, the following condition can be satisfied: $1 \leq 100 \times (A4070Mn/A3050Mx) \leq 1.5$.

In the optical image lens assembly according to the present disclosure, when the minimum absorbance in a wavelength range of 400 nm-700 nm of the defined-wavelength light absorbing optical lens element is A4070Mn, and a maximum absorbance in a wavelength range of 600 nm-800 nm of the defined-wavelength light absorbing optical lens element is A6080Mx, the following condition can be satisfied: $0 \leq 100 \times (A4070Mn/A6080Mx) \leq 10$. Therefore, it is favorable for preventing the color shift and maintaining the color realism of image. Furthermore, the following condition can be satisfied: $0 \leq 100 \times (A4070Mn/A6080Mx) \leq 5$. Furthermore, the following condition can be satisfied: $0 \leq 100 \times (A4070Mn/A6080Mx) \leq 4$. Furthermore, the following condition can be satisfied: $1 \leq 100 \times (A4070Mn/A6080Mx) \leq 4$.

In the optical image lens assembly according to the present disclosure, when the maximum absorbance in a wavelength range of 300 nm-500 nm of the defined-wavelength light absorbing optical lens element is A3050Mx, and the minimum absorbance in a wavelength range of 400 nm-700 nm of the defined-wavelength light absorbing optical lens element is A4070Mn, the following condition can be satisfied: $10 \leq A3050Mx/A4070Mn$. Therefore, it is favorable for maintaining the color realism of image and enhancing the durability of the optical lens elements. Furthermore, the following condition can be satisfied: $20 \leq A3050Mx/A4070Mn$. Furthermore, the following condition can be satisfied: $30 \leq A3050Mx/A4070Mn$. Furthermore, the following condition can be satisfied: $40 \leq A3050Mx/A4070Mn$. Furthermore, the following condition can be satisfied: $50 \leq A3050Mx/A4070Mn$.

In the optical image lens assembly according to the present disclosure, when the maximum absorbance in a wavelength range of 600 nm-800 nm of the defined-wavelength light absorbing optical lens element is A6080Mx, and the minimum absorbance in a wavelength range of 400 nm-700 nm of the defined-wavelength light absorbing optical lens element is A4070Mn, the following condition can be satisfied: $10 \leq A6080Mx/A4070Mn$. Therefore, it is favorable for preventing the color shift and maintaining the color realism of image. Furthermore, the following condition can be satisfied: $20 \leq A6080Mx/A4070Mn$.

In the optical image lens assembly according to the present disclosure, when a bandwidth having an absorbance larger than 2.0 in a wavelength range of 300 nm-450 nm of the defined-wavelength light absorbing optical lens element is BWA3045.2, the following condition can be satisfied: $BWA3045.2 \geq 30$ nm. Therefore, the absorbing range of the short-wavelength light can be expanded so as to reduce the image defects caused by purple flare in a strong light environment. Furthermore, the following condition can be satisfied: $BWA3045.2 \geq 50$ nm. Furthermore, the following condition can be satisfied: $BWA3045.2 \geq 60$ nm.

In the optical image lens assembly according to the present disclosure, when a wavelength having a maximum absorbance in a wavelength range of 300 nm-500 nm of the defined-wavelength light absorbing optical lens element is WA3050Mx, the following condition can be satisfied: $300 \text{ nm} \leq WA3050Mx \leq 420$ nm. The color realism of image can be maintained by selecting a suitable short-wavelength light absorbent. Furthermore, the following condition can be satisfied: $330 \text{ nm} \leq WA3050Mx \leq 410$ nm. Furthermore, the following condition can be satisfied: $330 \text{ nm} \leq WA3050Mx \leq 380$ nm. Furthermore, the following condition can be satisfied: $340 \text{ nm} \leq WA3050Mx \leq 370$ nm. Furthermore, the following condition can be satisfied: $350 \text{ nm} \leq WA3050Mx \leq 370$ nm.

In the optical image lens assembly according to the present disclosure, when a wavelength having a maximum absorbance in a wavelength range of 600 nm-800 nm of the defined-wavelength light absorbing optical lens element is WA6080Mx, the following condition can be satisfied: $WA6080Mx \geq 670$ nm. Therefore, it is favorable for reducing the color shift. Furthermore, the following condition can be satisfied: $WA6080Mx \geq 680$ nm.

In the optical image lens assembly according to the present disclosure, when a bandwidth having a transmittance smaller than 70% in a wavelength range of 400 nm-1100 nm of the defined-wavelength light absorbing optical lens element is BWT40110.7, the following condition can be satisfied: $10 \text{ nm} \leq BWT40110.7 \leq 200$ nm. Therefore, it is favorable for absorbing interference lights of a defined-wavelength region so as to reduce interference lights of a non-defined-wavelength region. Furthermore, the following condition can be satisfied: $0 \text{ nm} \leq BWT40110.7 \leq 200$ nm. Furthermore, the following condition can be satisfied: $0 \text{ nm} \leq BWT40110.7 \leq 180$ nm. Furthermore, the following condition can be satisfied: $0 \text{ nm} \leq BWT40110.7 \leq 150$ nm. Furthermore, the following condition can be satisfied: $10 \text{ nm} \leq BWT40110.7 \leq 120$ nm. Furthermore, the following condition can be satisfied: $50 \text{ nm} \leq BWT40110.7 \leq 80$ nm.

In the optical image lens assembly according to the present disclosure, when a bandwidth having a transmittance smaller than 50% in a wavelength range of 400 nm-1100 nm of the defined-wavelength light absorbing optical lens element is BWT40110.5, the following condition can be satisfied: $0 \text{ nm} < BWT40110.5 \leq 100$ nm. Therefore, it is favorable for absorbing interference lights of a defined-wavelength region so as to significantly reduce the intensity of interference lights with a non-major wavelength. Furthermore, the following condition can be satisfied: $0 \text{ nm} < BWT40110.5 \leq 150$ nm. Furthermore, the following condition can be satisfied: $0 \text{ nm} < BWT40110.5 \leq 120$ nm. Furthermore, the following condition can be satisfied: $10 \text{ nm} < BWT40110.5 \leq 110$ nm. Furthermore, the following condition can be satisfied: $10 \text{ nm} < BWT40110.5 \leq 90$ nm. Furthermore, the following condition can be satisfied: $30 \text{ nm} < BWT40110.5 \leq 70$ nm.

In the optical image lens assembly according to the present disclosure, when a bandwidth having a transmittance smaller than 30% in a wavelength range of 400 nm-1100 nm of the defined-wavelength light absorbing optical lens element is BWT40110.3, the following condition can be satisfied: $0 \text{ nm} < BWT40110.3 \leq 80$ nm. Therefore, it is favorable for absorbing interference lights of a defined-wavelength region so as to enhance the relative penetrating strength of lights in a target wavelength region. Furthermore, the following condition can be satisfied: $0 \text{ nm} < BWT40110.3 \leq 100$ nm. Furthermore, the following condition can be satisfied: $0 \text{ nm} < BWT40110.3 \leq 90$ nm. Furthermore, the following condition can be satisfied: 10 nm<BWT40110.3≤80 nm. Furthermore, the following condition can be satisfied: 20 nm<BWT40110.3≤50 nm.

In the optical image lens assembly according to the present disclosure, when a maximum absorbance in a wavelength range of 400 nm-1100 nm of the defined-wavelength light absorbing optical lens element is A40110Mx, the following condition can be satisfied: 0.25≤A40110Mx. Therefore, it is favorable for enhancing the absorbing ability to absorbing interference lights of a defined-wavelength region. Furthermore, the following condition can be satisfied: 0.5≤A40110Mx. Furthermore, the following condition can be satisfied: 1.0≤A40110Mx. Furthermore, the following condition can be satisfied: 1.25≤A40110Mx. Furthermore, the following condition can be satisfied: 1.3≤A40110Mx.

In the optical image lens assembly according to the present disclosure, when a wavelength having a maximum absorbance in a wavelength range of 400 nm-1100 nm of the defined-wavelength light absorbing optical lens element is WA40110Mx, the following condition can be satisfied: 400 nm≤WA40110Mx≤700 nm. Therefore, it is favorable for enhancing the color contrast of different visible lights and absorbing interference lights of a target wavelength region selectively. Furthermore, the following condition can be satisfied: 500 nm≤WA40110Mx≤800 nm. Furthermore, the following condition can be satisfied: 600 nm≤WA40110Mx≤900 nm. Furthermore, the following condition can be satisfied: 800 nm≤WA40110Mx≤1100 nm. Furthermore, the following condition can be satisfied: 900 nm≤WA40110Mx≤1100 nm.

In the optical image lens assembly according to the present disclosure, wherein the defined-wavelength light absorbing optical lens element has a low penetrated narrowband having a transmittance smaller than 50% in a wavelength range of 600 nm-900 nm. Therefore, it is favorable for increasing the relative light penetrating intensity of a target wavelength in the long-wavelength region and reducing the interference light intensity near a defined wavelength by absorbing interference lights of a defined wavelength region.

In the optical image lens assembly according to the present disclosure, the defined-wavelength light absorbing optical lens element has a low penetrated narrowband having a transmittance smaller than 30% in a wavelength range of 800 nm-1100 nm. Therefore, it is favorable for increasing the relative light penetrating intensity of a target wavelength in an ultra-long-wavelength region and reducing the interference light intensity near a defined wavelength by absorbing interference lights of a defined wavelength region.

In the optical image lens assembly according to the present disclosure, when the Abbe number of the defined-wavelength light absorbing optical lens element is V, the following condition can be satisfied: V≤50.0. Therefore, it is favorable for enhancing the light focusing ability by a plastic material with high refractive indexes. More preferably, when the bandwidth having a transmittance smaller than 50% in a wavelength range of 400 nm-1100 nm of the defined-wavelength light absorbing optical lens element is BWT40110.5, the following condition can be satisfied: 0 nm<BWT40110.5≤100 nm. Therefore, larger freedom can be obtained and the light interference in a non-target wavelength region can be reduced, and the relative light penetrating intensity of a target wavelength region can be increased.

In the optical image lens assembly according to the present disclosure, the defined-wavelength light absorbing optical lens element has a low penetrated narrowband having a transmittance smaller than 70% in a wavelength range of 400 nm-700 nm. Therefore, it is favorable for enhancing the color contrast of the blue visible light region, the green visible light region and the red visible light region.

Each of the aforementioned features of the optical image lens assembly of the present disclosure can be utilized in numerous combinations, so as to achieve the corresponding functionality.

In the optical image lens assembly according to the present disclosure, if the optical image lens assembly includes two of the defined-wavelength light absorbing optical lens elements, the average transmittance in the wavelength range of 380 nm-430 nm of all of the defined-wavelength light absorbing optical lens elements T3843 or the average transmittance in the wavelength range of 520 nm-570 nm of all of the defined-wavelength light absorbing optical lens elements T5257 is obtained by respectively calculating and averaging the T3843 or T5257 of the two defined-wavelength light absorbing optical lens elements.

In the optical image lens assembly according to the present disclosure, the chief ray of the optical image lens assembly is a light which passes a center of the entrance pupil, and the definition of the maximum image height of the imaging area is the field of view in 1.0F.

In the optical image lens assembly according to the present disclosure, a wavelength of the short-wavelength region is smaller than a wavelength of the long-wavelength region, and a wavelength of the ultra-long-wavelength region is larger than the wavelength of the long-wavelength region. Furthermore, both of the wavelength of the short-wavelength region and the wavelength of the long-wavelength region can include portions of the wavelength of visible light (usually refers to lights in a wavelength range of 400 nm-700 nm).

In the optical image lens assembly according to the present disclosure, the optical image lens assembly can be equipped with an aperture stop, a barrel member, a light blocking element, a fixing element, a cover glass, a light filtering element, and so on according to actual needs.

In the optical image lens assembly according to the present disclosure, the aperture stop can be a front aperture stop or a middle aperture stop, and the arrangement of the aperture stop is for controlling the maximum amount of the entering light in the center of the imaging area of the optical image lens assembly. The front aperture stop is an aperture stop disposed on an object side of the first optical lens element of the optical image lens assembly, and the middle aperture stop is an aperture stop disposed between the first optical lens element and the image plane. If the aperture stop of the optical image lens assembly is the front aperture stop, a distance between an exit pupil thereof and the image plane can be larger so as to have an of telecentric effect and improve the image accepting effectivity of the image sensor such as CCD or CMOS. If the aperture stop of the optical image lens assembly is the middle aperture stop, the angle of the field of view of the optical image lens assembly can be broaden, so that the optical image lens assembly can have an advantage of wide angle.

In the optical image lens assembly according to the present disclosure, the optical image lens assembly can include at least one stop disposed in front of the first optical lens element, between the optical lens elements, or back to the last optical lens element thereof. Furthermore, the type of the stop can be a glare stop or a field stop so as to reduce stray light and enhance the image quality.

In the optical image lens assembly according to the present disclosure, both of an object-side surface and the image-side surface of the optical image lens assembly can be aspheric surfaces (ASP). The aspheric surface can be made into a shape other than a spherical shape, so that more control variables can be obtained so as to reduce aberration and lower the equipped number of the optical lens elements, and the total length of the optical image lens assembly can be reduced effectively. Furthermore, the plastic material thereof can also be replaced with a resin material.

In the optical image lens assembly according to the present disclosure, if the surfaces of the optical lens elements are convex and the convex position is not defined, it means that the surfaces of the optical lens elements can be convex in a paraxial region thereof, and if the surfaces of the optical lens elements are concave and the concave position is not defined, it means that the surfaces of the optical lens elements can be concave in a paraxial region thereof. Furthermore, in the optical image lens assembly according to the present disclosure, if the optical lens element has positive refractive power or negative refractive power or includes a focal length, it means the optical lens element have refractive power in the paraxial region thereof and includes a focal length in the paraxial region thereof. Moreover, the position of the refractive power of the optical lens element can be located on the optical axis, in the off-axis region thereof or in the peripheral region thereof.

In the optical image lens assembly according to the present disclosure, the image plane can be a plane or a curved surface having any curvature depending on the corresponding image sensor thereof. In particular, the curved surface can be a curved surface being concave toward the object side thereof.

The present disclosure provides an image capturing apparatus including the optical image lens assembly according to the aforementioned aspect and an image sensor. The image sensor is disposed on the image plane of the optical image lens assembly. By the arrangement of the defined-wavelength light absorbing optical lens element in the optical image lens assembly and a proper transmitted distance for passing through the chief ray, it is favorable for obtaining a better local color saturation, and the color shift in the off-axial field can be avoided so as to enhance the filtering degree of the infrared light. More preferably, the image capturing apparatus can further include a barrel member, a holder member, or a combination thereof.

In the optical image lens assembly according to the present disclosure, an aperture control unit can be properly configured. The aperture control unit can be a mechanical element or a light controlling element, and the dimension and the shape of the aperture control unit can be electrically controlled. The mechanical element can include a moveable component such a blade group or a shielding plate. The light controlling element can include a screen component such as a light filter, an electrochromic material, a liquid crystal layer or the like. The amount of incoming light or the exposure time of the image can be controlled by the aperture control unit to enhance the image moderation ability. In addition, the aperture control unit can be the aperture stop of the photographing optical lens assembly according to the present disclosure, so as to moderate the image quality by changing f-number such as changing the depth of field or the exposure speed.

The image capturing apparatus according to the present disclosure can be applied to the three-dimensional (3D) image capturing, digital cameras, mobile products, digital tablets, smart TVs, network monitoring devices, somatosensory game consoles, driving recorders, reversing and developing devices, wearable products, and other electronic devices. The aforementioned electronic devices are used to demonstrate the practical applications of the present disclosure only, and the applications of the image capturing apparatus according to the present disclosure are not limited thereto.

The present disclosure provides an electronic device, which can be a mobile device, includes the image capturing apparatus according to the aforementioned aspect. Therefore, the image quality can be effectively enhanced. More preferably, the electronic device can further include a control unit, a display, a storage unit, a random-access memory (RAM), or the combination thereof.

According to the above description of the present disclosure, the following specific embodiments are provided for further explanation.

1st Embodiment

FIG. 1 is a schematic view of an image capturing apparatus according to the 1st embodiment of the present disclosure. As shown in FIG. 1, the image capturing apparatus (reference number is omitted) of the 1st embodiment includes an optical image lens assembly (reference number is omitted) and an image sensor 196. The optical image lens assembly includes a center of an entrance pupil 101. The optical image lens assembly includes, in order from an object-side to an image-side, an aperture stop 100, a first optical lens element 110, a second optical lens element 120, a defined-wavelength light absorbing optical lens element 170, a fourth optical lens element 140, a fifth optical lens element 150, an IR-cut coating 180, a cover glass 190 and an image plane 195, wherein the image sensor 196 is disposed on the image plane 195 of the optical image lens assembly.

The first optical lens element 110 has positive refractive power, and both of an object-side surface 111 and an image-side surface 112 of the first optical lens element 110 are aspheric. The first optical lens element 110 is made of a plastic material and is formed by an injection molding method, wherein the plastic material can be a COC/COP material, such as the APL series or the ZEON series of Mitsui Chemicals.

The second optical lens element 120 has negative refractive power, and both of an object-side surface 121 and an image-side surface 122 of the second optical lens element 120 are aspheric. The second optical lens element 120 is made of a plastic material and is formed by an injection molding method.

The defined-wavelength light absorbing optical lens element 170 has negative refractive power, and both of an object-side surface 171 and an image-side surface 172 of the defined-wavelength light absorbing optical lens element 170 are aspheric. The defined-wavelength light absorbing optical lens element 170 is made of a thermoplastic material, and the defined-wavelength light absorbing optical lens element 170 is formed by an injection molding method. The defined-wavelength light absorbing optical lens element 170 can be made of a high refractive polycarbonate (PC) material, such as the EP series of MGC or the SP series of TEIJIN. Furthermore, the plastic material of the defined-wavelength light absorbing optical lens element 170 can be replaced with the polyester material, such as the OKP series of the OGC. The defined-wavelength light absorbing optical lens element 170 includes at least one defined-wavelength light absorbent. The defined-wavelength light absorbent can be a commercially available absorbing organometallic compound in the injection molding grade, and the defined-wavelength light absorbent is uniformly distributed in the defined-wavelength light absorbing optical lens element 170.

The fourth optical lens element 140 has positive refractive power, and both of an object-side surface 141 and an image-side surface 142 of the fourth optical lens element 140 are aspheric. The fourth optical lens element 140 is made of a plastic material and is formed by an injection molding method.

The fifth optical lens element 150 has negative refractive power, and both of an object-side surface 151 and an image-side surface 152 of the fifth optical lens element 150 are aspheric. The fifth optical lens element 150 is made of a plastic material and is formed by an injection molding method.

The cover glass 190 is disposed between the fifth optical lens element 150 and the image plane 195 and will not affect a focal length of the optical image lens assembly.

The IR-cut coating 180 is disposed on an object-side surface (reference number is omitted) of the cover glass 190, that is, the IR-cut coating 180 is located between the optical image lens assembly and the image plane 195, and the IR-cut coating 180 can be penetrated by the visible light and can filter the near infrared light.

In the optical image lens assembly of the 1st embodiment, when an Abbe number of the defined-wavelength light absorbing optical lens element 170 is V, and a refractive index of the defined-wavelength light absorbing optical lens element 170 is N, the following conditions are satisfied: V=19.4; and N=1.67.

Please refer to Table 1 below.

the CP/CP0 value thereof is between 1.0 and 1.09, but the present disclosure is not be limited thereto.

The definitions of the transmittance, absorbance and other parameters of the 1st embodiment are the same as the aforementioned description and are not repeated again.

2nd Embodiment

Figure 2:
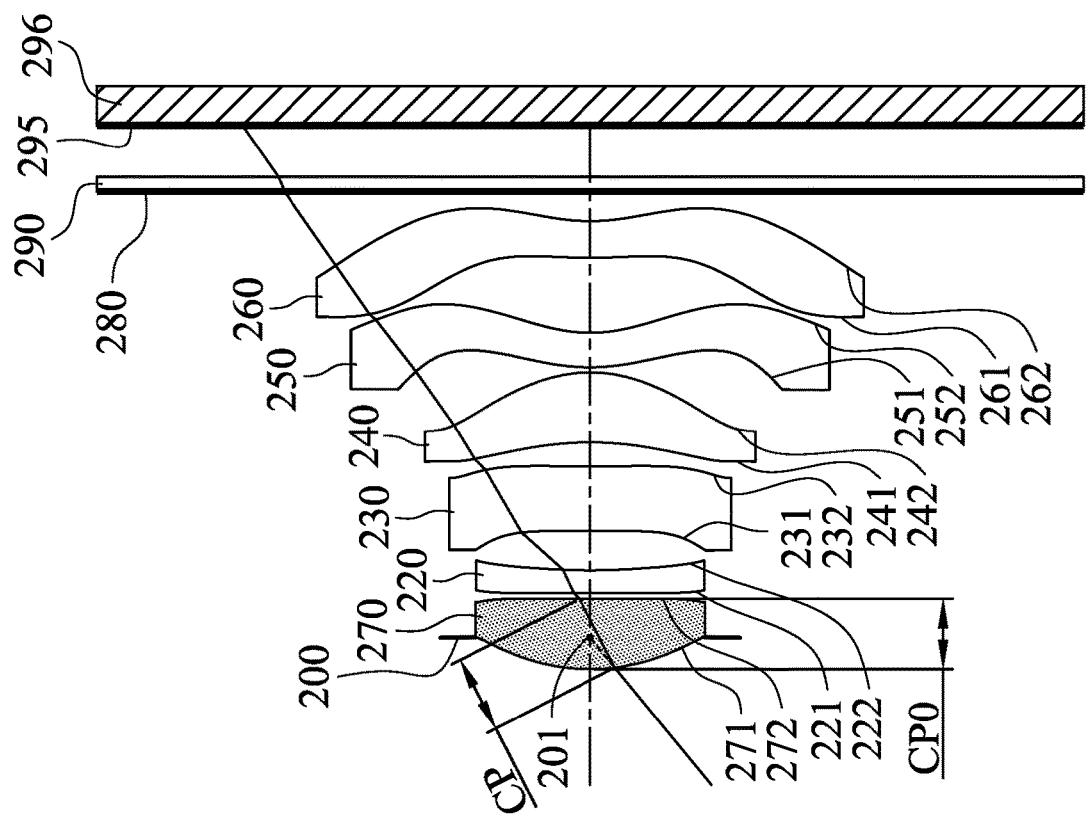
FIG. 2 is a schematic view of an image capturing apparatus according to the 2nd embodiment of the present disclosure.

FIG. 2 is a schematic view of an image capturing apparatus according to the 2nd embodiment of the present disclosure. As shown in FIG. 2, the image capturing apparatus of the 2nd embodiment includes an optical image lens assembly (reference number is omitted) and an image sensor 296. The optical image lens assembly includes a center of an entrance pupil 201. The optical image lens assembly includes, in order from an object-side to an image-side, an aperture stop 200, a defined-wavelength light absorbing optical lens element 270, a second optical lens element 220, a third optical lens element 230, a fourth optical lens element 240, a fifth optical lens element 250, a sixth optical lens element 260, an IR-cut coating 280, a cover glass 290 and an image plane 295, wherein the image sensor 296 is disposed on the image plane 295 of the optical image lens assembly.

The aperture stop 200 is for controlling a maximum entering amount of light in a center of an imaging area of the optical image lens assembly.

The defined-wavelength light absorbing optical lens element 270 has positive refractive power, and both of an object-side surface 271 and an image-side surface 272 of the defined-wavelength light absorbing optical lens element 270

TABLE 1

| | 1st embodiment | | | | | | | | | |
|---|---|---|---|---|---|---|---|---|---|---|
| | CP (mm) | | | | | CP/CP0 | | | | |
| Field | P1 | P2 | P3 | P4 | P5 | P1 | P2 | P3 | P4 | P5 |
| Axis (0 F) | 0.61 | 0.22 | 0.38 | 0.43 | 0.33 | 1.00 | 1.00 | 1.00 | 1.00 | 1.00 |
| 0.1F | 0.61 | 0.22 | 0.38 | 0.43 | 0.34 | 1.00 | 1.00 | 1.00 | 0.99 | 1.04 |
| 0.2F | 0.61 | 0.22 | 0.39 | 0.41 | 0.39 | 1.00 | 1.01 | 1.01 | 0.96 | 1.17 |
| 0.3F | 0.61 | 0.22 | 0.39 | 0.39 | 0.45 | 1.01 | 1.02 | 1.02 | 0.91 | 1.36 |
| 0.4F | 0.62 | 0.23 | 0.39 | 0.37 | 0.53 | 1.02 | 1.03 | 1.02 | 0.85 | 1.62 |
| 0.5F | 0.62 | 0.23 | 0.40 | 0.34 | 0.62 | 1.03 | 1.05 | 1.03 | 0.78 | 1.88 |
| 0.6F | 0.63 | 0.23 | 0.40 | 0.31 | 0.70 | 1.04 | 1.06 | 1.04 | 0.72 | 2.11 |
| 0.7F | 0.64 | 0.24 | 0.40 | 0.30 | 0.75 | 1.05 | 1.09 | 1.04 | 0.68 | 2.27 |
| 0.8F | 0.65 | 0.24 | 0.39 | 0.29 | 0.77 | 1.07 | 1.10 | 1.03 | 0.68 | 2.32 |
| 0.9F | 0.65 | 0.25 | 0.39 | 0.31 | 0.73 | 1.08 | 1.13 | 1.01 | 0.72 | 2.20 |
| 1.0F | 0.66 | 0.25 | 0.38 | 0.36 | 0.59 | 1.09 | 1.15 | 0.98 | 0.84 | 1.80 |
| Minimum value of CP/CP0 | | | | | | 1.00 | 1.00 | 0.98 | 0.68 | 1.00 |
| Maximum value of CP/CP0 | | | | | | 1.09 | 1.15 | 1.04 | 1.00 | 2.32 |

CP (Axis) = CP0

The detailed data of CP and CP/CP0 of each of the optical lens elements of the 1st embodiment are shown in Table 1, wherein P1 to P5 are, in order from the object side to the image side, the first optical lens element 110, the second optical lens element 120, the defined-wavelength light absorbing optical lens element 170, the fourth optical lens element 140 and the fifth optical lens element 150.

In the 1st embodiment, the defined-wavelength light absorbing optical lens element 170 is the third optical lens element, in order from the object-side to the image-side, of the optical image lens assembly, and the CP/CP0 thereof falls between 0.98 to 1.04. However, if the production factors are considered, the defined-wavelength light absorbing optical lens element 170 can also be disposed as the first optical lens element of the optical image lens assembly, and are aspheric. The defined-wavelength light absorbing optical lens element 270 is disposed adjacent to the aperture stop 200. The defined-wavelength light absorbing optical lens element 270 is made of a thermoplastic material and is formed by an injection molding method, wherein the thermoplastic material is a COC/COP material. The defined-wavelength light absorbing optical lens element 270 includes at least one defined-wavelength light absorbent. The at least one defined-wavelength light absorbent can be a commercially available absorbing organometallic compound in the injection molding grade, and the defined-wavelength light absorbent is uniformly distributed in the defined-wavelength light absorbing optical lens element 270.

The second optical lens element 220 has negative refractive power, and both of an object-side surface 221 and an image-side surface 222 of the second optical lens element 120 are aspheric. The second optical lens element 220 is made of a plastic material and is formed by an injection molding method, wherein the plastic material a high refractive polycarbonate (PC) material such as the EP series of MGC or the SP series of TEIJIN.

The third optical lens element 230 has negative refractive power, and both of an object-side surface 231 and an image-side surface 232 of the third optical lens element 230 are aspheric. The third optical lens element 230 is made of a plastic material and is formed by an injection molding method.

The fourth optical lens element 240 has positive refractive power, and both of an object-side surface 241 and an image-side surface 242 of the fourth optical lens element 240 are aspheric. The fourth optical lens element 240 is made of a plastic material and is formed by an injection molding method.

The fifth optical lens element 250 has negative refractive power, and both of an object-side surface 251 and an image-side surface 252 of the fifth optical lens element 250 are aspheric. The fifth optical lens element 250 is made of a plastic material and is formed by an injection molding method.

The sixth optical lens element 260 has negative refractive power, and both of an object-side surface 261 and an image-side surface 262 of the sixth optical lens element 260 are aspheric. The sixth optical lens element 260 is made of a plastic material and is formed by an injection molding method.

The cover glass 290 is disposed between the sixth optical lens element 260 and the image plane 295 and will not affect a focal length of the optical image lens assembly.

The IR-cut coating 280 is disposed on an object-side surface (reference number is omitted) of the cover glass 290, that is, the IR-cut coating 280 is located between the optical image lens assembly and the image plane 295, and the IR-cut coating 280 can be penetrated by the visible light and can filter the near infrared light.

In the optical image lens assembly of the 2nd embodiment, when an Abbe number of the defined-wavelength light absorbing optical lens element 270 is V, and a refractive index of the defined-wavelength light absorbing optical lens element 270 is N, the following conditions are satisfied: V=56.0; and N=1.54.

Please refer to Table 2 below.

The detailed data of CP and CP/CP0 of each of the optical lens elements of the 2nd embodiment are shown in Table 2, wherein P1 to P6 are, in order from the object side to the image side, the defined-wavelength light absorbing optical lens element 270, the second optical lens element 220, the third optical lens element 230, the fourth optical lens element 240, the fifth optical lens element 250 and the sixth optical lens element 260.

In the 2nd embodiment, the defined-wavelength light absorbing optical lens element 270 of the optical image lens assembly is the first optical lens element, in order from the object-side to the image-side, of the optical image lens assembly, and the CP/CP0 thereof falls between 1.00~1.09. However, if the production factors are considered, the defined-wavelength light absorbing optical lens element 270 can also be disposed as the second optical lens element of the optical image lens assembly, and the CP/CP0 thereof is between 1.00~1.14, but the present disclosure is not be limited thereto.

The definitions of the transmittance, absorbance and other parameters of the 2nd embodiment are the same as the aforementioned description and are not repeated again.

The following 1st comparative embodiment and the 2nd comparative embodiment which are without the defined-wavelength light absorbent, and the 3rd embodiment to the 11th embodiment which include the plastic materials and the defined-wavelength light absorbent of the present disclosure are provided for further explanation.

1st Comparative Embodiment

The defined-wavelength light absorbing optical lens element of the 1st comparative embodiment is without the defined-wavelength light absorbent, and the plastic material thereof is COC/COP.

Table 3 shows detailed data of transmittance and absorbance at specific wavelengths of the defined-wavelength light absorbing optical lens element of the 1st comparative embodiment, wherein T is a transmittance of the defined-wavelength light absorbing optical lens element at a specific wavelength, and A is an absorbance of the defined-wavelength light absorbing optical lens element at a specific wavelength.

TABLE 2

| 2nd embodiment | | | | | | | | | | | | |
| --- | --- | --- | --- | --- | --- | --- | --- | --- | --- | --- | --- | --- |
| | CP (mm) | | | | | | CP/CP0 | | | | | |
| Field | P1 | P2 | P3 | P4 | P5 | P6 | P1 | P2 | P3 | P4 | P5 | P6 |
| Axis (0 F) | 0.55 | 0.23 | 0.93 | 0.43 | 0.36 | 0.45 | 1.00 | 1.00 | 1.00 | 1.00 | 1.00 | 1.00 |
| 0.1F | 0.55 | 0.23 | 0.93 | 0.43 | 0.35 | 0.46 | 1.00 | 1.00 | 1.00 | 1.00 | 0.99 | 1.02 |
| 0.2F | 0.55 | 0.23 | 0.92 | 0.43 | 0.34 | 0.50 | 1.01 | 1.01 | 1.00 | 1.01 | 0.97 | 1.10 |
| 0.3F | 0.56 | 0.23 | 0.92 | 0.44 | 0.33 | 0.56 | 1.01 | 1.02 | 0.99 | 1.02 | 0.94 | 1.23 |
| 0.4F | 0.56 | 0.24 | 0.91 | 0.44 | 0.33 | 0.63 | 1.02 | 1.03 | 0.98 | 1.03 | 0.92 | 1.40 |
| 0.5F | 0.57 | 0.24 | 0.90 | 0.44 | 0.33 | 0.71 | 1.03 | 1.04 | 0.97 | 1.04 | 0.92 | 1.57 |
| 0.6F | 0.57 | 0.24 | 0.88 | 0.45 | 0.34 | 0.77 | 1.04 | 1.06 | 0.95 | 1.05 | 0.95 | 1.71 |
| 0.7F | 0.58 | 0.25 | 0.85 | 0.45 | 0.36 | 0.82 | 1.05 | 1.08 | 0.92 | 1.06 | 1.01 | 1.81 |
| 0.8F | 0.59 | 0.25 | 0.82 | 0.46 | 0.39 | 0.84 | 1.07 | 1.10 | 0.89 | 1.08 | 1.09 | 1.87 |
| 0.9F | 0.59 | 0.26 | 0.78 | 0.47 | 0.41 | 0.85 | 1.08 | 1.12 | 0.84 | 1.11 | 1.15 | 1.88 |
| 1.0F | 0.60 | 0.26 | 0.72 | 0.50 | 0.43 | 0.80 | 1.09 | 1.14 | 0.78 | 1.16 | 1.22 | 1.77 |
| Minimum value of CP/CP0 | | | | | | | 1.00 | 1.00 | 0.78 | 1.00 | 0.92 | 1.00 |
| Maximum value of CP/CP0 | | | | | | | 1.09 | 1.14 | 1.00 | 1.16 | 1.22 | 1.88 |

CP (Axis) = CP0

TABLE 3

| | Name |
|---|---|
| Defined-wavelength light absorbent | N/A |
| Plastic material | COC/COP |

| Wavelength (nm) | T (%) | A |
|---|---|---|
| 200 | 1.2 | 1.909 |
| 210 | 1.2 | 1.924 |
| 220 | 1.1 | 1.969 |
| 230 | 1.2 | 1.926 |
| 240 | 1.5 | 1.834 |
| 250 | 1.3 | 1.896 |
| 260 | 1.4 | 1.870 |
| 270 | 1.2 | 1.933 |
| 280 | 1.0 | 1.997 |
| 290 | 2.2 | 1.651 |
| 300 | 6.8 | 1.170 |
| 310 | 9.5 | 1.021 |
| 320 | 14.0 | 0.854 |
| 330 | 24.4 | 0.612 |
| 340 | 46.4 | 0.333 |
| 350 | 64.8 | 0.189 |
| 360 | 73.4 | 0.134 |
| 370 | 78.2 | 0.107 |
| 380 | 81.0 | 0.091 |
| 390 | 83.6 | 0.078 |
| 400 | 84.8 | 0.072 |
| 410 | 86.4 | 0.063 |
| 420 | 87.1 | 0.060 |
| 430 | 88.3 | 0.054 |
| 440 | 88.7 | 0.052 |
| 450 | 89.1 | 0.050 |
| 460 | 89.4 | 0.048 |
| 470 | 89.6 | 0.048 |
| 480 | 90.1 | 0.045 |
| 490 | 90.1 | 0.045 |
| 500 | 90.5 | 0.043 |
| 510 | 90.5 | 0.043 |
| 520 | 90.7 | 0.042 |
| 530 | 90.9 | 0.042 |
| 540 | 91.0 | 0.041 |
| 550 | 90.9 | 0.041 |
| 560 | 90.9 | 0.041 |
| 570 | 91.1 | 0.040 |
| 580 | 91.1 | 0.040 |
| 590 | 91.1 | 0.040 |
| 600 | 91.2 | 0.040 |
| 610 | 91.1 | 0.041 |
| 620 | 91.3 | 0.039 |
| 630 | 91.4 | 0.039 |
| 640 | 91.3 | 0.040 |
| 650 | 91.1 | 0.041 |
| 660 | 91.3 | 0.039 |
| 670 | 91.2 | 0.040 |
| 680 | 91.3 | 0.039 |
| 690 | 91.3 | 0.040 |
| 700 | 91.3 | 0.039 |
| 710 | 91.4 | 0.039 |
| 720 | 91.3 | 0.039 |
| 730 | 91.3 | 0.040 |
| 740 | 91.2 | 0.040 |
| 750 | 91.3 | 0.040 |
| 760 | 91.3 | 0.039 |
| 770 | 91.6 | 0.038 |
| 780 | 91.6 | 0.038 |
| 790 | 91.4 | 0.039 |
| 800 | 91.4 | 0.039 |

Absorbance (A) = $-\text{LOG}_{10}$ (Transmittance)

The following parameters can be calculated from Table 3 as the following values and satisfy the following conditions, wherein T2030 is an average transmittance in a wavelength range of 200 nm-300 nm of all of the defined-wavelength light absorbing optical lens elements, T2535 is an average transmittance in a wavelength range of 250 nm-350 nm of all of the defined-wavelength light absorbing optical lens elements, T3040 is an average transmittance in a wavelength range of 300 nm-400 nm of all of the defined-wavelength light absorbing optical lens elements, T3045 is an average transmittance in a wavelength range of 300 nm-450 nm of all of the defined-wavelength light absorbing optical lens elements, T3545 is an average transmittance in a wavelength range of 350 nm-450 nm of all of the defined-wavelength light absorbing optical lens elements, T3843 is an average transmittance in a wavelength range of 380 nm-430 nm of all of the defined-wavelength light absorbing optical lens elements, T4050 is an average transmittance in a wavelength range of 400 nm-500 nm of all of the defined-wavelength light absorbing optical lens elements, T4560 is an average transmittance in a wavelength range of 450 nm-600 nm of all of the defined-wavelength light absorbing optical lens elements, T5257 is an average transmittance in a wavelength range of 520 nm-570 nm of all of the defined-wavelength light absorbing optical lens elements, T6570 is an average transmittance in a wavelength range of 650 nm-700 nm of all of the defined-wavelength light absorbing optical lens elements, T6771 is an average transmittance in a wavelength range of 670 nm-710 nm of all of the defined-wavelength light absorbing optical lens elements, and SWuT50 is a wavelength having a 50% transmittance and an increasing trend in a wavelength range of 300 nm-500 nm of the defined-wavelength light absorbing optical lens element. The aforementioned definition of the transmittance and the absorbance can be calculated from a wavelength region according to actual needs. For example, the average transmittance in the wavelength range of 200 nm-300 nm can be defined as T2030, and an average absorbance in the wavelength range of 300 nm-500 nm can be defined as A3050, and so on.

| 1st Comparative Embodiment | |
|---|---|
| T2030 (%) | 1.8 |
| T2535 (%) | 15.7 |
| T3040 (%) | 51.5 |
| T3045 (%) | 62.9 |
| T3545 (%) | 82.3 |
| T3843 (%) | 85.2 |
| T4050 (%) | 88.6 |
| T4560 (%) | 90.5 |
| T5257 (%) | 90.9 |
| T6570 (%) | 91.3 |
| T6771 (%) | 91.3 |
| SWuT50 (nm) | 340-350 |

2nd Comparative Embodiment

The defined-wavelength light absorbing optical lens element of the 2nd comparative embodiment is without the defined-wavelength light absorbent, and the plastic material thereof is COC/COP.

Table 4 shows detailed data of transmittance and absorbance at specific wavelengths of the defined-wavelength light absorbing optical lens element of the 2nd comparative embodiment, and the definition of T and A are the same as the 1st comparative embodiment and not be described again.

TABLE 4

| | Name |
|---|---|
| Defined-wavelength light absorbent | N/A |
| Plastic material | COC/COP |

| Wavelength (nm) | T (%) | A |
|---|---|---|
| 350 | 85.1 | 0.070 |
| 360 | 88.3 | 0.054 |
| 370 | 89.7 | 0.047 |
| 380 | 90.8 | 0.042 |
| 390 | 90.0 | 0.046 |
| 400 | 91.4 | 0.039 |
| 410 | 91.7 | 0.038 |
| 420 | 91.0 | 0.041 |
| 430 | 90.9 | 0.042 |
| 440 | 90.9 | 0.041 |
| 450 | 90.9 | 0.042 |
| 460 | 90.7 | 0.042 |
| 470 | 90.9 | 0.041 |
| 480 | 90.5 | 0.043 |
| 490 | 90.7 | 0.042 |
| 500 | 90.3 | 0.044 |
| 510 | 90.4 | 0.044 |
| 520 | 90.4 | 0.044 |
| 530 | 90.3 | 0.044 |
| 540 | 90.6 | 0.043 |
| 550 | 90.3 | 0.044 |
| 560 | 90.9 | 0.042 |
| 570 | 90.4 | 0.044 |
| 580 | 90.5 | 0.043 |
| 590 | 90.6 | 0.043 |
| 600 | 89.9 | 0.046 |
| 610 | 90.3 | 0.044 |
| 620 | 89.9 | 0.046 |
| 630 | 89.5 | 0.048 |
| 640 | 90.1 | 0.045 |
| 650 | 90.6 | 0.043 |
| 660 | 90.1 | 0.045 |
| 670 | 89.8 | 0.047 |
| 680 | 89.7 | 0.047 |
| 690 | 89.2 | 0.049 |
| 700 | 89.4 | 0.049 |
| 710 | 89.4 | 0.049 |
| 720 | 89.2 | 0.050 |
| 730 | 89.7 | 0.047 |
| 740 | 90.0 | 0.046 |
| 750 | 89.5 | 0.048 |
| 760 | 90.0 | 0.046 |
| 770 | 89.7 | 0.047 |
| 780 | 89.3 | 0.049 |
| 790 | 89.8 | 0.047 |
| 800 | 90.2 | 0.045 |
| 810 | 90.1 | 0.045 |
| 820 | 89.0 | 0.051 |
| 830 | 90.2 | 0.045 |
| 840 | 88.8 | 0.052 |
| 850 | 91.1 | 0.040 |
| 860 | 92.1 | 0.036 |
| 870 | 91.7 | 0.037 |
| 880 | 92.1 | 0.036 |
| 890 | 91.4 | 0.039 |
| 900 | 91.0 | 0.041 |
| 910 | 90.7 | 0.042 |
| 920 | 91.3 | 0.040 |
| 930 | 91.2 | 0.040 |
| 940 | 91.4 | 0.039 |
| 950 | 91.1 | 0.040 |
| 960 | 91.2 | 0.040 |
| 970 | 90.8 | 0.042 |
| 980 | 91.2 | 0.040 |
| 990 | 90.9 | 0.041 |
| 1000 | 91.3 | 0.040 |
| 1010 | 90.5 | 0.043 |
| 1020 | 90.8 | 0.042 |
| 1030 | 90.7 | 0.042 |
| 1040 | 90.7 | 0.042 |
| 1050 | 90.5 | 0.043 |
| 1060 | 90.9 | 0.042 |
| 1070 | 90.8 | 0.042 |
| 1080 | 90.5 | 0.043 |
| 1090 | 90.6 | 0.043 |
| 1100 | 90.6 | 0.043 |

Absorbance (A) = $-\mathrm{LOG}_{10}$ (Transmittance)

3rd Embodiment

The defined-wavelength light absorbing optical lens element of the 3rd embodiment includes one defined-wavelength light absorbent, which is the UV/blue light absorbent E-42, and the defined-wavelength light absorbing optical lens element is made of COC/COP. The defined-wavelength light absorbing optical lens element has an average transmittance larger than 50% in all of a blue visible light region, a green visible light region and a red visible light region. The defined-wavelength light absorbing optical lens element of the 3rd embodiment can be disposed in the optical image lens assembly of the 1st embodiment to 2nd embodiment, and the details of the optical image lens assembly and the image capturing apparatus of the 1st embodiment to 2nd embodiment are shown in the aforementioned description and are not repeated again.

Table 5 shows detailed data of transmittance and absorbance at specific wavelengths of the defined-wavelength light absorbing optical lens element of the 3rd embodiment, and the definition of T and A are the same as the 1st comparative embodiment and not be described again.

TABLE 5

| | Name |
|---|---|
| Defined-wavelength light absorbent | E-42 |
| Plastic material | COC/COP |

| Wavelength (nm) | T (%) | A |
|---|---|---|
| 200 | 3.8 | 1.422 |
| 210 | 3.3 | 1.487 |
| 220 | 2.8 | 1.548 |
| 230 | 2.5 | 1.594 |
| 240 | 2.2 | 1.652 |
| 250 | 1.4 | 1.843 |
| 260 | 2.2 | 1.666 |
| 270 | 2.5 | 1.595 |
| 280 | 2.3 | 1.632 |
| 290 | 2.5 | 1.595 |
| 300 | 1.8 | 1.739 |
| 310 | 1.5 | 1.824 |
| 320 | 1.2 | 1.907 |
| 330 | 0.8 | 2.073 |
| 340 | 0.4 | 2.382 |
| 350 | 0.2 | 2.684 |
| 360 | 0.2 | 2.770 |
| 370 | 0.6 | 2.253 |
| 380 | 6.1 | 1.218 |
| 390 | 36.6 | 0.437 |
| 400 | 68.0 | 0.168 |
| 410 | 81.4 | 0.089 |
| 420 | 86.6 | 0.063 |
| 430 | 88.8 | 0.051 |
| 440 | 89.6 | 0.048 |
| 450 | 90.2 | 0.045 |
| 460 | 90.4 | 0.044 |
| 470 | 90.4 | 0.044 |
| 480 | 90.5 | 0.044 |
| 490 | 90.7 | 0.042 |
| 500 | 90.7 | 0.042 |
| 510 | 91.0 | 0.041 |
| 520 | 91.0 | 0.041 |
| 530 | 91.2 | 0.040 |
| 540 | 91.1 | 0.041 |

TABLE 5-continued

| | | |
|---|---|---|
| 550 | 91.1 | 0.041 |
| 560 | 91.1 | 0.040 |
| 570 | 91.3 | 0.039 |
| 580 | 91.3 | 0.040 |
| 590 | 91.2 | 0.040 |
| 600 | 91.2 | 0.040 |
| 610 | 91.3 | 0.039 |
| 620 | 91.2 | 0.040 |
| 630 | 91.4 | 0.039 |
| 640 | 91.5 | 0.039 |
| 650 | 91.2 | 0.040 |
| 660 | 91.3 | 0.040 |
| 670 | 91.3 | 0.039 |
| 680 | 91.3 | 0.040 |
| 690 | 91.2 | 0.040 |
| 700 | 91.3 | 0.040 |
| 710 | 91.2 | 0.040 |
| 720 | 91.4 | 0.039 |
| 730 | 91.4 | 0.039 |
| 740 | 91.4 | 0.039 |
| 750 | 91.3 | 0.039 |
| 760 | 91.4 | 0.039 |
| 770 | 91.7 | 0.038 |
| 780 | 91.0 | 0.041 |
| 790 | 91.5 | 0.038 |
| 800 | 91.1 | 0.040 |

Absorbance (A) = $-\text{LOG}_{10}$ (Transmittance)

The following parameters can be calculated from Table 5 as the following values and satisfy the following conditions, wherein the definition of T2030, T2535, T3040, T3045, T3545, T3843, T4050, T4560, T5257, T6570, T6771 and SWuT50 are the same as the 1st comparative embodiment and not be described again. Furthermore, A3050Mx is a maximum absorbance in a wavelength range of 300 nm-500 nm of the defined-wavelength light absorbing optical lens element, WA3050Mx is a wavelength having a maximum absorbance in a wavelength range of 300 nm-500 nm of the defined-wavelength light absorbing optical lens element, A4070Mn is a minimum absorbance in a wavelength range of 400 nm-700 nm of the defined-wavelength light absorbing optical lens element, WA4070Mn is a wavelength having a minimum absorbance in a wavelength range of 400 nm-700 nm of the defined-wavelength light absorbing optical lens element, WA3045.2 is a wavelength having a maximum absorbance larger than 2.0 in a wavelength range of 300 nm-450 nm of the defined-wavelength light absorbing optical lens element, and BWA3045.2 a bandwidth having an absorbance larger than 2.0 in a wavelength range of 300 nm-450 nm of the defined-wavelength light absorbing optical lens element.

| 3rd Embodiment | |
|---|---|
| T2030 (%) | 2.5 |
| T2535 (%) | 1.5 |
| T3040 (%) | 10.7 |
| T3045 (%) | 34.6 |
| T3545 (%) | 49.8 |
| T3843 (%) | 61.2 |
| T4050 (%) | 87.0 |
| T4560 (%) | 90.9 |
| T5257 (%) | 91.1 |
| T6570 (%) | 91.2 |
| T6771 (%) | 91.2 |
| SWuT50 (nm) | 390-400 |
| A3050Mx | 2.770 |
| WA3050Mx (nm) | 360 |
| A4070Mn | 0.039 |
| WA4070Mn (nm) | 610 |
| 100 × (A4070Mn/A3050Mx) | 1.423 |
| A3050Mx/A4070Mn | 70.275 |
| WA3045.2 (nm) | 330-370 |
| BWA3045.2 (nm) | 40 |

In the 3rd embodiment, the defined-wavelength ranges having an average transmittance smaller than 50% are the wavelength range of 200 nm-300 nm, the wavelength range of 250 nm-350 nm, the wavelength range of 300 nm-400 nm, the wavelength range of 300 nm-450 nm and the wavelength range of 350 nm-450 nm, and the defined-wavelength ranges having an average transmittance larger than 50% are the wavelength range of 380 nm-430 nm, the wavelength range of 400 nm~500 nm, the wavelength range of 450 nm-600 nm, the wavelength range of 520 nm-570 nm, the wavelength range of 650 nm-700 nm and the wavelength range of 670 nm-710 nm.

4th Embodiment

The defined-wavelength light absorbing optical lens element of the 4th embodiment includes one defined-wavelength light absorbent, which is the UV/blue light absorbent E-95, and the defined-wavelength light absorbing optical lens element is made of COC/COP. The defined-wavelength light absorbing optical lens element has an average transmittance larger than 50% in all of a blue visible light region, a green visible light region and a red visible light region. The defined-wavelength light absorbing optical lens element of the 4th embodiment can be disposed in the optical image lens assembly of the 1st embodiment to 2nd embodiment, and the details of the optical image lens assembly and the image capturing apparatus of the 1st embodiment to 2nd embodiment are shown in the aforementioned description and are not repeated again.

Table 6 shows detailed data of transmittance and absorbance at specific wavelengths of the defined-wavelength light absorbing optical lens element of the 4th embodiment, and the definition of T and A are the same as the 1st comparative embodiment and not be described again.

TABLE 6

| | Name | |
|---|---|---|
| Defined-wavelength light absorbent | E-95 | |
| Plastic material | COC/COP | |
| Wavelength (nm) | T (%) | A |
| 200 | 2.1 | 1.685 |
| 210 | 0.0 | 3.357 |
| 220 | 0.9 | 2.043 |
| 230 | 0.7 | 2.176 |
| 240 | 0.4 | 2.359 |
| 250 | 0.4 | 2.388 |
| 260 | 0.4 | 2.363 |
| 270 | 0.5 | 2.321 |
| 280 | 0.8 | 2.076 |
| 290 | 12.3 | 0.912 |
| 300 | 16.0 | 0.795 |
| 310 | 13.3 | 0.877 |
| 320 | 10.2 | 0.993 |
| 330 | 27.1 | 0.567 |
| 340 | 10.8 | 0.967 |
| 350 | 1.5 | 1.832 |
| 360 | 0.2 | 2.684 |
| 370 | 0.1 | 2.836 |
| 380 | 0.1 | 2.827 |
| 390 | 0.1 | 2.827 |

TABLE 6-continued

| | | |
|---|---|---|
| 400 | 0.2 | 2.780 |
| 410 | 0.2 | 2.801 |
| 420 | 0.2 | 2.706 |
| 430 | 0.5 | 2.346 |
| 440 | 12.0 | 0.920 |
| 450 | 54.3 | 0.265 |
| 460 | 80.9 | 0.092 |
| 470 | 88.5 | 0.053 |
| 480 | 90.3 | 0.044 |
| 490 | 90.6 | 0.043 |
| 500 | 90.8 | 0.042 |
| 510 | 90.8 | 0.042 |
| 520 | 90.9 | 0.041 |
| 530 | 91.0 | 0.041 |
| 540 | 91.0 | 0.041 |
| 550 | 91.0 | 0.041 |
| 560 | 91.1 | 0.041 |
| 570 | 91.1 | 0.040 |
| 580 | 91.2 | 0.040 |
| 590 | 91.2 | 0.040 |
| 600 | 91.1 | 0.040 |
| 610 | 91.3 | 0.039 |
| 620 | 91.2 | 0.040 |
| 630 | 91.3 | 0.040 |
| 640 | 91.2 | 0.040 |
| 650 | 91.3 | 0.039 |
| 660 | 91.3 | 0.040 |
| 670 | 91.3 | 0.039 |
| 680 | 91.3 | 0.039 |
| 690 | 91.2 | 0.040 |
| 700 | 91.2 | 0.040 |
| 710 | 91.4 | 0.039 |
| 720 | 91.2 | 0.040 |
| 730 | 91.2 | 0.040 |
| 740 | 91.3 | 0.040 |
| 750 | 91.4 | 0.039 |
| 760 | 91.7 | 0.037 |
| 770 | 91.8 | 0.037 |
| 780 | 91.0 | 0.041 |
| 790 | 91.6 | 0.038 |
| 800 | 91.3 | 0.040 |

Absorbance (A) = $-\text{LOG}_{10}$ (Transmittance)

The following parameters can be calculated from Table 6 as the following values and satisfy the following conditions, wherein the definition of T2030, T2535, T3040, T3045, T3545, T3843, T4050, T4560, T5257, T6570, T6771, SWuT50, A3050Mx, WA3050Mx, A4070Mn, WA4070Mn, WA3045.2 and BWA3045.2 are the same as the 1st comparative embodiment and the 3rd embodiment and not be described again.

| 4th Embodiment | |
|---|---|
| T2030 (%) | 3.1 |
| T2535 (%) | 8.5 |
| T3040 (%) | 7.2 |
| T3045 (%) | 9.2 |
| T3545 (%) | 6.3 |
| T3843 (%) | 0.2 |
| T4050 (%) | 46.2 |
| T4560 (%) | 87.9 |
| T5257 (%) | 91.0 |
| T6570 (%) | 91.3 |
| T6771 (%) | 91.3 |
| SWuT50 (nm) | 440-450 |
| A3050Mx | 2.836 |
| WA3050Mx (nm) | 370 |
| A4070Mn | 0.039 |
| WA4070Mn (nm) | 610 |
| 100 × (A4070Mn/A3050Mx) | 1.388 |
| A3050Mx/A4070Mn | 72.021 |
| WA3045.2 (nm) | 360-430 |
| BWA3045.2 (nm) | 70 |

In the 4th embodiment, the defined-wavelength ranges having an average transmittance smaller than 50% are the wavelength range of 200 nm-300 nm, the wavelength range of 250 nm-350 nm, the wavelength range of 300 nm-400 nm, the wavelength range of 300 nm-450 nm, the wavelength range of 350 nm-450 nm, the wavelength range of 380 nm-430 nm and the wavelength range of 400 nm~500 nm, and the defined-wavelength ranges having an average transmittance larger than 50% are the wavelength range of 450 nm-600 nm, the wavelength range of 520 nm-570 nm, the wavelength range of 650 nm-700 nm and the wavelength range of 670 nm-710 nm.

5th Embodiment

The defined-wavelength light absorbing optical lens element of the 5th embodiment includes one defined-wavelength light absorbent, which is the UV/blue light absorbent E-39, and the defined-wavelength light absorbing optical lens element is made of COC/COP. The defined-wavelength light absorbing optical lens element has an average transmittance larger than 50% in all of a blue visible light region, a green visible light region and a red visible light region. The defined-wavelength light absorbing optical lens element of the 5th embodiment can be disposed in the optical image lens assembly of the 1st embodiment to 2nd embodiment, and the details of the optical image lens assembly and the image capturing apparatus of the 1st embodiment to 2nd embodiment are shown in the aforementioned description and are not repeated again.

Table 7 shows detailed data of transmittance and absorbance at specific wavelengths of the defined-wavelength light absorbing optical lens element of the 5th embodiment, and the definition of T and A are the same as the 1st comparative embodiment and not be described again.

TABLE 7

| | Name |
|---|---|
| Defined-wavelength light absorbent | E-39 |
| Plastic material | COC/COP |

| Wavelength (nm) | T (%) | A |
|---|---|---|
| 200 | 0.6 | 2.212 |
| 210 | 0.7 | 2.155 |
| 220 | 0.3 | 2.583 |
| 230 | 0.4 | 2.383 |
| 240 | 0.4 | 2.381 |
| 250 | 0.5 | 2.326 |
| 260 | 0.5 | 2.301 |
| 270 | 0.4 | 2.437 |
| 280 | 0.3 | 2.573 |
| 290 | 0.4 | 2.358 |
| 300 | 0.2 | 2.622 |
| 310 | 0.2 | 2.815 |
| 320 | 0.2 | 2.757 |
| 330 | 1.3 | 1.901 |
| 340 | 3.5 | 1.452 |
| 350 | 1.6 | 1.792 |
| 360 | 0.4 | 2.408 |
| 370 | 0.2 | 2.730 |
| 380 | 0.2 | 2.818 |
| 390 | 0.2 | 2.783 |
| 400 | 0.2 | 2.757 |
| 410 | 0.2 | 2.777 |
| 420 | 0.2 | 2.656 |
| 430 | 1.6 | 1.808 |
| 440 | 25.3 | 0.597 |
| 450 | 66.1 | 0.180 |
| 460 | 84.4 | 0.074 |
| 470 | 89.3 | 0.049 |

TABLE 7-continued

| Wavelength | T | A |
|---|---|---|
| 480 | 90.5 | 0.044 |
| 490 | 90.7 | 0.042 |
| 500 | 90.8 | 0.042 |
| 510 | 90.9 | 0.041 |
| 520 | 91.2 | 0.040 |
| 530 | 91.2 | 0.040 |
| 540 | 91.4 | 0.039 |
| 550 | 91.5 | 0.039 |
| 560 | 91.5 | 0.039 |
| 570 | 91.5 | 0.039 |
| 580 | 91.5 | 0.038 |
| 590 | 91.6 | 0.038 |
| 600 | 91.7 | 0.038 |
| 610 | 91.6 | 0.038 |
| 620 | 91.7 | 0.038 |
| 630 | 91.6 | 0.038 |
| 640 | 91.5 | 0.038 |
| 650 | 91.6 | 0.038 |
| 660 | 91.7 | 0.038 |
| 670 | 91.6 | 0.038 |
| 680 | 91.5 | 0.039 |
| 690 | 91.4 | 0.039 |
| 700 | 91.6 | 0.038 |
| 710 | 91.5 | 0.038 |
| 720 | 91.7 | 0.038 |
| 730 | 91.6 | 0.038 |
| 740 | 91.7 | 0.038 |
| 750 | 91.8 | 0.037 |
| 760 | 91.8 | 0.037 |
| 770 | 92.0 | 0.036 |
| 780 | 91.9 | 0.037 |
| 790 | 92.1 | 0.036 |
| 800 | 92.0 | 0.036 |

Absorbance (A) = $-LOG_{10}$ (Transmittance)

The following parameters can be calculated from Table 7 as the following values and satisfy the following conditions, wherein the definition of T2030, T2535, T3040, T3045, T3545, T3843, T4050, T4560, T5257, T6570, T6771, SWuT50, A3050Mx, WA3050Mx, A4070Mn, WA4070Mn, WA3045.2 and BWA3045.2 are the same as the 1st comparative embodiment and the 3rd embodiment and not be described again.

| 5th Embodiment | |
|---|---|
| T2030 (%) | 0.4 |
| T2535 (%) | 0.8 |
| T3040 (%) | 0.7 |
| T3045 (%) | 6.3 |
| T3545 (%) | 8.7 |
| T3843 (%) | 0.4 |
| T4050 (%) | 49.0 |
| T4560 (%) | 89.1 |
| T5257 (%) | 91.4 |
| T6570 (%) | 91.6 |
| T6771 (%) | 91.5 |
| SWuT50 (nm) | 440-450 |
| A3050Mx | 2.818 |
| WA3050Mx (nm) | 380 |
| A4070Mn | 0.038 |
| WA4070Mn (nm) | 620 |
| 100 × (A4070Mn/A3050Mx) | 1.331 |
| A3050Mx/A4070Mn | 75.145 |
| WA3045.2 (nm) | 300-320 |
| | 360-420 |
| BWA3045.2 (nm) | 80 |

In the 5th embodiment, the defined-wavelength ranges having an average transmittance smaller than 50% are the wavelength range of 200 nm-300 nm, the wavelength range of 250 nm-350 nm, the wavelength range of 300 nm-400 nm, the wavelength range of 300 nm-450 nm, the wavelength range of 350 nm-450 nm, the wavelength range of 380 nm-430 nm and the wavelength range of 400 nm~500 nm, and the defined-wavelength ranges having an average transmittance larger than 50% are the wavelength range of 450 nm-600 nm, the wavelength range of 520 nm-570 nm, the wavelength range of 650 nm-700 nm and the wavelength range of 670 nm-710 nm.

6th Embodiment

The defined-wavelength light absorbing optical lens element of the 6th embodiment includes one defined-wavelength light absorbent, which is the UV/blue light absorbent E-59, and the defined-wavelength light absorbing optical lens element is made of COC/COP. The defined-wavelength light absorbing optical lens element has an average transmittance larger than 50% in all of a blue visible light region, a green visible light region and a red visible light region. The defined-wavelength light absorbing optical lens element of the 6th embodiment can be disposed in the optical image lens assembly of the 1st embodiment to 2nd embodiment, and the details of the optical image lens assembly and the image capturing apparatus of the 1st embodiment to 2nd embodiment are shown in the aforementioned description and are not repeated again.

Table 8 shows detailed data of transmittance and absorbance at specific wavelengths of the defined-wavelength light absorbing optical lens element of the 6th embodiment, and the definition of T and A are the same as the 1st comparative embodiment and not be described again.

TABLE 8

| | Name | |
|---|---|---|
| Defined-wavelength light absorbent | E-59 | |
| Plastic material | COC/COP | |
| Wavelength (nm) | T (%) | A |
| 200 | 87.3 | 0.059 |
| 210 | 74.3 | 0.129 |
| 220 | 60.2 | 0.220 |
| 230 | 40.3 | 0.394 |
| 240 | 46.9 | 0.329 |
| 250 | 47.2 | 0.326 |
| 260 | 50.8 | 0.294 |
| 270 | 45.4 | 0.343 |
| 280 | 38.4 | 0.416 |
| 290 | 35.0 | 0.456 |
| 300 | 29.0 | 0.538 |
| 310 | 23.3 | 0.633 |
| 320 | 19.4 | 0.713 |
| 330 | 17.6 | 0.754 |
| 340 | 20.8 | 0.681 |
| 350 | 23.7 | 0.624 |
| 360 | 28.1 | 0.551 |
| 370 | 27.7 | 0.557 |
| 380 | 27.2 | 0.565 |
| 390 | 25.4 | 0.595 |
| 400 | 23.8 | 0.623 |
| 410 | 22.7 | 0.644 |
| 420 | 22.4 | 0.650 |
| 430 | 33.0 | 0.481 |
| 440 | 68.6 | 0.164 |
| 450 | 83.8 | 0.077 |
| 460 | 88.7 | 0.052 |
| 470 | 90.1 | 0.045 |
| 480 | 90.6 | 0.043 |
| 490 | 90.7 | 0.042 |
| 500 | 90.8 | 0.042 |
| 510 | 90.9 | 0.041 |
| 520 | 91.2 | 0.040 |
| 530 | 91.1 | 0.040 |
| 540 | 91.2 | 0.040 |

TABLE 8-continued

| | | |
|---|---|---|
| 550 | 91.3 | 0.040 |
| 560 | 91.2 | 0.040 |
| 570 | 91.4 | 0.039 |
| 580 | 91.5 | 0.039 |
| 590 | 91.5 | 0.039 |
| 600 | 91.6 | 0.038 |
| 610 | 91.6 | 0.038 |
| 620 | 91.5 | 0.038 |
| 630 | 91.5 | 0.039 |
| 640 | 91.4 | 0.039 |
| 650 | 91.4 | 0.039 |
| 660 | 91.6 | 0.038 |
| 670 | 91.5 | 0.038 |
| 680 | 91.4 | 0.039 |
| 690 | 91.5 | 0.039 |
| 700 | 91.5 | 0.039 |
| 710 | 91.1 | 0.040 |
| 720 | 91.6 | 0.038 |
| 730 | 91.6 | 0.038 |
| 740 | 91.5 | 0.039 |
| 750 | 91.8 | 0.037 |
| 760 | 91.6 | 0.038 |
| 770 | 91.6 | 0.038 |
| 780 | 91.7 | 0.038 |
| 790 | 92.0 | 0.036 |
| 800 | 92.2 | 0.035 |

Absorbance (A) = $-\mathrm{LOG}_{10}$ (Transmittance)

The following parameters can be calculated from Table 8 as the following values and satisfy the following conditions, wherein the definition of T2030, T2535, T3040, T3045, T3545, T3843, T4050, T4560, T5257, T6570, T6771, SWuT50, A3050Mx, WA3050Mx, A4070Mn and WA4070Mn are the same as the 1st comparative embodiment and the 3rd embodiment and not be described again.

| 6th Embodiment | |
|---|---|
| T2030 (%) | 50.4 |
| T2535 (%) | 31.9 |
| T3040 (%) | 24.2 |
| T3045 (%) | 31.0 |
| T3545 (%) | 35.1 |
| T3843 (%) | 25.8 |
| T4050 (%) | 64.1 |
| T4560 (%) | 90.5 |
| T5257 (%) | 91.2 |
| T6570 (%) | 91.5 |
| T6771 (%) | 91.4 |
| SWuT50 (nm) | 430-440 |
| A3050Mx | 0.754 |
| WA3050Mx (nm) | 330 |
| A4070Mn | 0.038 |
| WA4070Mn (nm) | 610 |
| 100 × (A4070Mn/A3050Mx) | 5.086 |
| A3050Mx/A4070Mn | 19.663 |

In the 6th embodiment, the defined-wavelength ranges having an average transmittance smaller than 50% are the wavelength range of 200 nm-300 nm, the wavelength range of 250 nm-350 nm, the wavelength range of 300 nm-400 nm, the wavelength range of 300 nm-450 nm, the wavelength range of 350 nm-450 nm and the wavelength range of 380 nm-430 nm, and the defined-wavelength ranges having an average transmittance larger than 50% are the wavelength range of 400 nm~500 nm, the wavelength range of 450 nm-600 nm, the wavelength range of 520 nm-570 nm, the wavelength range of 650 nm-700 nm and the wavelength range of 670 nm-710 nm.

7th Embodiment

The defined-wavelength light absorbing optical lens element of the 7th embodiment includes three kinds of defined-wavelength light absorbent, which are the UV/blue light absorbent E-43 and the red/infrared light absorbent IR-59 and IR-65, and the defined-wavelength light absorbing optical lens element is made of COC/COP. The defined-wavelength light absorbing optical lens element has an average transmittance larger than 50% in both of a blue visible light region and a green visible light region. The defined-wavelength light absorbing optical lens element has a low penetrated narrowband having a transmittance smaller than 70% in a wavelength range of 400 nm-700 nm, the defined-wavelength light absorbing optical lens element has a low penetrated narrowband having a transmittance smaller than 50% in a wavelength range of 400 nm-700 nm, the defined-wavelength light absorbing optical lens element has a low penetrated narrowband having a transmittance smaller than 30% in a wavelength range of 400 nm-700 nm, the defined-wavelength light absorbing optical lens element has a low penetrated narrowband having a transmittance smaller than 70% in a wavelength range of 600 nm-900 nm, the defined-wavelength light absorbing optical lens element has a low penetrated narrowband having a transmittance smaller than 50% in a wavelength range of 600 nm-900 nm, and the defined-wavelength light absorbing optical lens element has a low penetrated narrowband having a transmittance smaller than 30% in a wavelength range of 600 nm-900 nm. Furthermore, the defined-wavelength light absorbing optical lens element of the 7th embodiment can be disposed in the optical image lens assembly of the 1st embodiment to 2nd embodiment, and the details of the optical image lens assembly and the image capturing apparatus of the 1st embodiment to 2nd embodiment are shown in the aforementioned description and are not repeated again.

Table 9 shows detailed data of transmittance and absorbance at specific wavelengths of the defined-wavelength light absorbing optical lens element of the 7th embodiment, and the definition of T and A are the same as the 1st comparative embodiment and not be described again.

TABLE 9

| | Name |
|---|---|
| Defined-wavelength light absorbent | E-43 |
| | IR-59 |
| | IR-65 |
| Plastic material | COC/COP |

| Wavelength (nm) | T (%) | A |
|---|---|---|
| 200 | 2.5 | 1.601 |
| 210 | 1.9 | 1.722 |
| 220 | 1.7 | 1.768 |
| 230 | 1.5 | 1.823 |
| 240 | 1.3 | 1.892 |
| 250 | 1.0 | 1.997 |
| 260 | 1.0 | 2.012 |
| 270 | 1.1 | 1.959 |
| 280 | 1.2 | 1.911 |
| 290 | 1.2 | 1.913 |
| 300 | 1.0 | 1.998 |
| 310 | 0.8 | 2.113 |
| 320 | 0.6 | 2.236 |
| 330 | 0.4 | 2.453 |
| 340 | 0.2 | 2.684 |
| 350 | 0.1 | 2.903 |
| 360 | 0.1 | 3.032 |
| 370 | 0.1 | 2.951 |
| 380 | 0.3 | 2.519 |
| 390 | 1.4 | 1.849 |
| 400 | 5.8 | 1.239 |
| 410 | 19.1 | 0.719 |
| 420 | 39.6 | 0.402 |

TABLE 9-continued

| | | |
|---|---|---|
| 430 | 58.8 | 0.231 |
| 440 | 71.4 | 0.146 |
| 450 | 77.9 | 0.109 |
| 460 | 81.9 | 0.087 |
| 470 | 84.8 | 0.072 |
| 480 | 86.6 | 0.062 |
| 490 | 87.5 | 0.058 |
| 500 | 87.7 | 0.057 |
| 510 | 87.9 | 0.056 |
| 520 | 87.9 | 0.056 |
| 530 | 87.9 | 0.056 |
| 540 | 87.6 | 0.058 |
| 550 | 87.1 | 0.060 |
| 560 | 86.3 | 0.064 |
| 570 | 85.0 | 0.071 |
| 580 | 82.6 | 0.083 |
| 590 | 79.7 | 0.098 |
| 600 | 76.8 | 0.115 |
| 610 | 72.9 | 0.137 |
| 620 | 66.9 | 0.175 |
| 630 | 57.4 | 0.241 |
| 640 | 46.0 | 0.337 |
| 650 | 38.7 | 0.413 |
| 660 | 30.1 | 0.522 |
| 670 | 18.0 | 0.745 |
| 680 | 7.7 | 1.111 |
| 690 | 4.0 | 1.396 |
| 700 | 5.2 | 1.281 |
| 710 | 6.8 | 1.166 |
| 720 | 12.5 | 0.903 |
| 730 | 32.1 | 0.494 |
| 740 | 57.8 | 0.238 |
| 750 | 74.8 | 0.126 |
| 760 | 82.3 | 0.085 |
| 770 | 85.4 | 0.068 |
| 780 | 87.0 | 0.061 |
| 790 | 87.7 | 0.057 |
| 800 | 88.2 | 0.054 |

Absorbance (A) = $-\text{LOG}_{10}$ (Transmittance)

The following parameters can be calculated from Table 9 as the following values and satisfy the following conditions, wherein the definition of T2030, T2535, T3040, T3045, T3545, T3843, T4050, T4560, T5257, T6570, T6771, SWuT50, A3050Mx, WA3050Mx, A4070Mn, WA4070Mn, WA3045.2 and BWA3045.2 are the same as the 1st comparative embodiment and the 3rd embodiment and not be described again. Furthermore, LWdT50 is a wavelength having a 50% transmittance and an decreasing trend in a wavelength range of 500 nm-800 nm of the defined-wavelength light absorbing optical lens element, LWuT50 is a wavelength having a 50% transmittance and an increasing trend in a wavelength range of 500 nm-800 nm of the defined-wavelength light absorbing optical lens element, A6080Mx is a maximum absorbance in a wavelength range of 600 nm-800 nm of the defined-wavelength light absorbing optical lens element, WA6080Mx is a maximum absorbance in a wavelength range of 600 nm-800 nm of the defined-wavelength light absorbing optical lens element, BWT40110.7 is a bandwidth having a transmittance smaller than 70% in a wavelength range of 400 nm-1100 nm of the defined-wavelength light absorbing optical lens element, BWT40110.5 is a bandwidth having a transmittance smaller than 50% in a wavelength range of 400 nm-1100 nm of the defined-wavelength light absorbing optical lens element, BWT40110.3 is a bandwidth having a transmittance smaller than 30% in a wavelength range of 400 nm-1100 nm of the defined-wavelength light absorbing optical lens element, A40110Mx is a maximum absorbance in a wavelength range of 400 nm-1100 nm of the defined-wavelength light absorbing optical lens element, and WA40110Mx is a wavelength having a maximum absorbance in a wavelength range of 400 nm-1100 nm of the defined-wavelength light absorbing optical lens element.

| 7th Embodiment | |
|---|---|
| T2030 (%) | 1.4 |
| T2535 (%) | 0.8 |
| T3040 (%) | 1.0 |
| T3045 (%) | 17.3 |
| T3545 (%) | 25.0 |
| T3843 (%) | 20.8 |
| T4050 (%) | 63.7 |
| T4560 (%) | 84.7 |
| T5257 (%) | 87.0 |
| T6570 (%) | 17.3 |
| T6771 (%) | 8.4 |
| SWuT50 (nm) | 420-430 |
| LWdT50 (nm) | 630-640 |
| LWuT50 (nm) | 730-740 |
| A3050Mx | 3.032 |
| WA3050Mx (nm) | 360 |
| A6080Mx | 1.396 |
| WA6080Mx (nm) | 690 |
| A4070Mn | 0.056 |
| WA4070Mn (nm) | 520 |
| 100 × (A4070Mn/A3050Mx) | 1.841 |
| 100 × (A4070Mn/A6080Mx) | 3.999 |
| A3050Mx/A4070Mn | 54.305 |
| A6080Mx/A4070Mn | 25.009 |
| WA3045.2 (nm) | 310-380 |
| BWA3045.2 (nm) | 70 |
| BWT40110.7 (nm) | 130 |
| BWT40110.5 (nm) | 100 |
| BWT40110.3 (nm) | 60 |
| A40110Mx | 1.396 |
| WA40110Mx (nm) | 690 |

In the 7th embodiment, the defined-wavelength ranges having an average transmittance smaller than 50% are the wavelength range of 200 nm-300 nm, the wavelength range of 250 nm-350 nm, the wavelength range of 300 nm-400 nm, the wavelength range of 300 nm-450 nm, the wavelength range of 350 nm-450 nm, the wavelength range of 380 nm-430 nm, the wavelength range of 650 nm-700 nm and the wavelength range of 670 nm-710 nm, and the defined-wavelength ranges having an average transmittance larger than 50% are the wavelength range of 400 nm~500 nm, the wavelength range of 450 nm-600 nm and the wavelength range of 520 nm-570 nm.

8th Embodiment

The defined-wavelength light absorbing optical lens element of the 8th embodiment includes one defined-wavelength light absorbent, which is the UV/blue light absorbent G-390, and the defined-wavelength light absorbing optical lens element is made of COC/COP. The defined-wavelength light absorbing optical lens element has an average transmittance larger than 50% in all of a blue visible light region, a green visible light region and a red visible light region. Furthermore, the defined-wavelength light absorbing optical lens element of the 8th embodiment can be disposed in the optical image lens assembly of the 1st embodiment to 2nd embodiment, and the details of the optical image lens assembly and the image capturing apparatus of the 1st embodiment to 2nd embodiment are shown in the aforementioned description and are not repeated again.

Table 10 shows detailed data of transmittance and absorbance at specific wavelengths of the defined-wavelength light absorbing optical lens element of the 8th embodiment, and the definition of T and A are the same as the 1st comparative embodiment and not be described again.

TABLE 10

| | Name |
| --- | --- |
| Defined-wavelength light absorbent | G-390 |
| Plastic material | COC/COP |

| Wavelength (nm) | T (%) | A |
| --- | --- | --- |
| 200 | 91.8 | 0.037 |
| 210 | 81.4 | 0.089 |
| 220 | 70.7 | 0.151 |
| 230 | 46.1 | 0.336 |
| 240 | 56.4 | 0.249 |
| 250 | 58.1 | 0.236 |
| 260 | 56.1 | 0.251 |
| 270 | 49.0 | 0.310 |
| 280 | 42.0 | 0.377 |
| 290 | 44.7 | 0.350 |
| 300 | 44.2 | 0.354 |
| 310 | 41.9 | 0.378 |
| 320 | 44.3 | 0.353 |
| 330 | 44.4 | 0.353 |
| 340 | 39.9 | 0.399 |
| 350 | 35.5 | 0.449 |
| 360 | 32.9 | 0.482 |
| 370 | 30.8 | 0.511 |
| 380 | 29.5 | 0.530 |
| 390 | 28.0 | 0.554 |
| 400 | 26.7 | 0.573 |
| 410 | 26.2 | 0.582 |
| 420 | 27.6 | 0.559 |
| 430 | 48.8 | 0.311 |
| 440 | 78.5 | 0.105 |
| 450 | 87.0 | 0.060 |
| 460 | 89.4 | 0.049 |
| 470 | 90.2 | 0.045 |
| 480 | 90.6 | 0.043 |
| 490 | 90.6 | 0.043 |
| 500 | 90.7 | 0.043 |
| 510 | 90.7 | 0.042 |
| 520 | 90.6 | 0.043 |
| 530 | 90.9 | 0.041 |
| 540 | 91.0 | 0.041 |
| 550 | 90.9 | 0.042 |
| 560 | 90.9 | 0.042 |
| 570 | 91.1 | 0.041 |
| 580 | 91.0 | 0.041 |
| 590 | 91.1 | 0.040 |
| 600 | 91.1 | 0.040 |
| 610 | 91.2 | 0.040 |
| 620 | 91.2 | 0.040 |
| 630 | 91.1 | 0.040 |
| 640 | 91.2 | 0.040 |
| 650 | 91.2 | 0.040 |
| 660 | 91.2 | 0.040 |
| 670 | 91.3 | 0.039 |
| 680 | 91.2 | 0.040 |
| 690 | 91.1 | 0.040 |
| 700 | 91.1 | 0.040 |
| 710 | 91.4 | 0.039 |
| 720 | 91.4 | 0.039 |
| 730 | 91.3 | 0.040 |
| 740 | 91.4 | 0.039 |
| 750 | 91.1 | 0.040 |
| 760 | 91.3 | 0.039 |
| 770 | 91.4 | 0.039 |
| 780 | 91.7 | 0.038 |
| 790 | 91.5 | 0.039 |
| 800 | 91.4 | 0.039 |

Absorbance (A) = $-\mathrm{LOG}_{10}$ (Transmittance)

The following parameters can be calculated from Table 10 as the following values and satisfy the following conditions, wherein the definition of T2030, T2535, T3040, T3045, T3545, T3843, T4050, T4560, T5257, T6570, T6771, SWuT50, A3050Mx, WA3050Mx, A4070Mn and WA4070Mn are the same as the 1st comparative embodiment and the 3rd embodiment and not be described again.

| 8th Embodiment | |
| --- | --- |
| T2030 (%) | 58.2 |
| T2535 (%) | 45.5 |
| T3040 (%) | 36.2 |
| T3045 (%) | 41.6 |
| T3545 (%) | 41.1 |
| T3843 (%) | 31.1 |
| T4050 (%) | 67.8 |
| T4560 (%) | 90.5 |
| T5257 (%) | 90.9 |
| T6570 (%) | 91.2 |
| T6771 (%) | 91.2 |
| SWuT50 (nm) | 430-440 |
| A3050Mx | 0.582 |
| WA3050Mx (nm) | 410 |
| A4070Mn | 0.039 |
| WA4070Mn (nm) | 670 |
| 100 × (A4070Mn/A3050Mx) | 6.784 |
| A3050Mx/A4070Mn | 14.741 |

In the 8th embodiment, the defined-wavelength ranges having an average transmittance smaller than 50% are the wavelength range of 250 nm-350 nm, the wavelength range of 300 nm-400 nm, the wavelength range of 300 nm-450 nm, the wavelength range of 350 nm-450 nm, the wavelength range of 380 nm-430 nm, and the defined-wavelength ranges having an average transmittance larger than 50% are the wavelength range of 200 nm-300 nm, the wavelength range of 400 nm~500 nm, the wavelength range of 450 nm-600 nm, the wavelength range of 520 nm-570 nm, the wavelength range of 650 nm-700 nm and the wavelength range of 670 nm-710 nm.

9th Embodiment

The defined-wavelength light absorbing optical lens element of the 9th embodiment includes one defined-wavelength light absorbent NA-02, and the defined-wavelength light absorbing optical lens element is made of PC. The defined-wavelength light absorbing optical lens element has an average transmittance larger than 50% in all of a blue visible light region, a green visible light region and a red visible light region. The defined-wavelength light absorbing optical lens element has a low penetrated narrowband having a transmittance smaller than 70% in a wavelength range of 400 nm-700 nm, and the defined-wavelength light absorbing optical lens element has a low penetrated narrowband having a transmittance smaller than 50% in a wavelength range of 400 nm-700 nm. Furthermore, the defined-wavelength light absorbing optical lens element of the 9th embodiment can be disposed in the optical image lens assembly of the 1st embodiment to 2nd embodiment, and the details of the optical image lens assembly and the image capturing apparatus of the 1st embodiment to 2nd embodiment are shown in the aforementioned description and are not repeated again.

Table 11 shows detailed data of transmittance and absorbance at specific wavelengths of the defined-wavelength light absorbing optical lens element of the 9th embodiment, and the definition of T and A are the same as the 1st comparative embodiment and not be described again.

TABLE 11

| | Name |
|---|---|
| Defined-wavelength light absorbent | NA02 |
| Plastic material | PC |

| Wavelength (nm) | T (%) | A |
|---|---|---|
| 350 | 42.7 | 0.370 |
| 360 | 63.6 | 0.196 |
| 370 | 74.0 | 0.131 |
| 380 | 78.3 | 0.106 |
| 390 | 80.8 | 0.093 |
| 400 | 82.7 | 0.083 |
| 410 | 83.9 | 0.076 |
| 420 | 85.0 | 0.071 |
| 430 | 85.8 | 0.066 |
| 440 | 86.6 | 0.063 |
| 450 | 86.7 | 0.062 |
| 460 | 87.3 | 0.059 |
| 470 | 87.2 | 0.060 |
| 480 | 87.4 | 0.058 |
| 490 | 87.3 | 0.059 |
| 500 | 87.3 | 0.059 |
| 510 | 86.5 | 0.063 |
| 520 | 86.0 | 0.066 |
| 530 | 84.8 | 0.072 |
| 540 | 80.4 | 0.095 |
| 550 | 79.4 | 0.100 |
| 560 | 79.6 | 0.099 |
| 570 | 78.1 | 0.107 |
| 580 | 72.1 | 0.142 |
| 590 | 48.1 | 0.318 |
| 600 | 47.0 | 0.328 |
| 610 | 74.6 | 0.128 |
| 620 | 85.1 | 0.070 |
| 630 | 87.0 | 0.060 |
| 640 | 87.7 | 0.057 |
| 650 | 88.1 | 0.055 |
| 660 | 88.2 | 0.054 |
| 670 | 88.2 | 0.054 |
| 680 | 88.4 | 0.054 |
| 690 | 88.6 | 0.053 |
| 700 | 88.7 | 0.052 |
| 710 | 88.7 | 0.052 |
| 720 | 88.8 | 0.052 |
| 730 | 88.8 | 0.051 |
| 740 | 88.8 | 0.052 |
| 750 | 89.0 | 0.051 |
| 760 | 89.1 | 0.050 |
| 770 | 89.2 | 0.050 |
| 780 | 89.0 | 0.051 |
| 790 | 89.1 | 0.050 |
| 800 | 89.1 | 0.050 |
| 810 | 89.6 | 0.048 |
| 820 | 88.6 | 0.052 |
| 830 | 88.9 | 0.051 |
| 840 | 89.2 | 0.050 |
| 850 | 89.0 | 0.051 |
| 860 | 89.1 | 0.050 |
| 870 | 89.1 | 0.050 |
| 880 | 89.0 | 0.051 |
| 890 | 89.0 | 0.051 |
| 900 | 89.1 | 0.050 |
| 910 | 89.1 | 0.050 |
| 920 | 89.3 | 0.049 |
| 930 | 89.2 | 0.049 |
| 940 | 89.3 | 0.049 |
| 950 | 89.2 | 0.049 |
| 960 | 89.2 | 0.050 |
| 970 | 89.3 | 0.049 |
| 980 | 89.2 | 0.050 |
| 990 | 89.3 | 0.049 |
| 1000 | 89.4 | 0.049 |
| 1010 | 89.4 | 0.049 |
| 1020 | 89.3 | 0.049 |
| 1030 | 89.2 | 0.049 |
| 1040 | 89.3 | 0.049 |
| 1050 | 89.4 | 0.049 |
| 1060 | 89.2 | 0.049 |
| 1070 | 89.3 | 0.049 |
| 1080 | 89.4 | 0.049 |
| 1090 | 89.3 | 0.049 |
| 1100 | 89.2 | 0.049 |

Absorbance (A) = $-LOG_{10}$ (Transmittance)

The following parameters can be calculated from Table 11 as the following values and satisfy the following conditions, wherein the definition of BWT40110.7, BWT40110.5, BWT40110.3, A40110Mx and WA40110Mx are the same as the 7th embodiment and not be described again.

| 9th Embodiment | |
|---|---|
| BWT40110.7 (nm) | 20 |
| BWT40110.5 (nm) | 20 |
| BWT40110.3 (nm) | 0 |
| A40110Mx | 0.328 |
| WA40110Mx (nm) | 600 |

10th Embodiment

The defined-wavelength light absorbing optical lens element of the 10th embodiment includes one defined-wavelength light absorbent IR14, and the defined-wavelength light absorbing optical lens element is made of COC/COP. The defined-wavelength light absorbing optical lens element has an average transmittance larger than 50% in all of a blue visible light region, a green visible light region and a red visible light region. The defined-wavelength light absorbing optical lens element has a low penetrated narrowband having a transmittance smaller than 50% in a wavelength range of 600 nm-900 nm, and the defined-wavelength light absorbing optical lens element has a low penetrated narrowband having a transmittance smaller than 30% in a wavelength range of 600 nm-900 nm. Furthermore, the defined-wavelength light absorbing optical lens element of the 10th embodiment can be disposed in the optical image lens assembly of the 1st embodiment to 2nd embodiment, and the details of the optical image lens assembly and the image capturing apparatus of the 1st embodiment to 2nd embodiment are shown in the aforementioned description and are not repeated again.

Table 12 shows detailed data of transmittance and absorbance at specific wavelengths of the defined-wavelength light absorbing optical lens element of the 10th embodiment, and the definition of T and A are the same as the 1st comparative embodiment and not be described again.

TABLE 12

| | Name |
|---|---|
| Defined-wavelength light absorbent | IR14 |
| Plastic material | COC/COP |

| Wavelength (nm) | T (%) | A |
|---|---|---|
| 350 | 85.8 | 0.067 |
| 360 | 87.8 | 0.057 |
| 370 | 88.4 | 0.053 |
| 380 | 88.8 | 0.052 |
| 390 | 88.0 | 0.056 |
| 400 | 87.2 | 0.060 |
| 410 | 87.1 | 0.060 |
| 420 | 87.4 | 0.058 |
| 430 | 87.9 | 0.056 |
| 440 | 88.2 | 0.055 |

TABLE 12-continued

| Wavelength | T | A |
|---|---|---|
| 450 | 89.3 | 0.049 |
| 460 | 90.3 | 0.044 |
| 470 | 90.8 | 0.042 |
| 480 | 91.2 | 0.040 |
| 490 | 91.2 | 0.040 |
| 500 | 91.2 | 0.040 |
| 510 | 91.1 | 0.041 |
| 520 | 91.1 | 0.041 |
| 530 | 91.0 | 0.041 |
| 540 | 90.9 | 0.041 |
| 550 | 91.0 | 0.041 |
| 560 | 90.6 | 0.043 |
| 570 | 90.3 | 0.044 |
| 580 | 89.9 | 0.046 |
| 590 | 89.2 | 0.049 |
| 600 | 88.5 | 0.053 |
| 610 | 87.2 | 0.060 |
| 620 | 84.9 | 0.071 |
| 630 | 82.4 | 0.084 |
| 640 | 80.1 | 0.096 |
| 650 | 76.2 | 0.118 |
| 660 | 68.3 | 0.166 |
| 670 | 57.7 | 0.239 |
| 680 | 43.6 | 0.361 |
| 690 | 29.3 | 0.533 |
| 700 | 26.5 | 0.577 |
| 710 | 41.9 | 0.378 |
| 720 | 66.2 | 0.179 |
| 730 | 82.2 | 0.085 |
| 740 | 88.2 | 0.055 |
| 750 | 89.7 | 0.047 |
| 760 | 90.2 | 0.045 |
| 770 | 90.3 | 0.044 |
| 780 | 90.4 | 0.044 |
| 790 | 90.3 | 0.044 |
| 800 | 90.3 | 0.044 |
| 810 | 90.3 | 0.044 |
| 820 | 90.1 | 0.045 |
| 830 | 90.5 | 0.043 |
| 840 | 90.5 | 0.043 |
| 850 | 91.3 | 0.039 |
| 860 | 91.8 | 0.037 |
| 870 | 91.4 | 0.039 |
| 880 | 91.8 | 0.037 |
| 890 | 91.8 | 0.037 |
| 900 | 91.8 | 0.037 |
| 910 | 91.7 | 0.038 |
| 920 | 91.6 | 0.038 |
| 930 | 91.5 | 0.038 |
| 940 | 91.8 | 0.037 |
| 950 | 91.9 | 0.037 |
| 960 | 91.8 | 0.037 |
| 970 | 91.8 | 0.037 |
| 980 | 91.4 | 0.039 |
| 990 | 91.5 | 0.038 |
| 1000 | 91.6 | 0.038 |
| 1010 | 91.7 | 0.037 |
| 1020 | 91.3 | 0.040 |
| 1030 | 91.4 | 0.039 |
| 1040 | 91.3 | 0.040 |
| 1050 | 91.0 | 0.041 |
| 1060 | 91.6 | 0.038 |
| 1070 | 91.2 | 0.040 |
| 1080 | 91.2 | 0.040 |
| 1090 | 91.3 | 0.040 |
| 1100 | 91.4 | 0.039 |

Absorbance (A) = $-LOG_{10}$ (Transmittance)

The following parameters can be calculated from Table 12 as the following values and satisfy the following conditions, wherein the definition of BWT40110.7, BWT40110.5, BWT40110.3, A40110Mx and WA40110Mx are the same as the 7th embodiment and not be described again.

| 10th Embodiment | |
|---|---|
| BWT40110.7 (nm) | 70 |
| BWT40110.5 (nm) | 40 |
| BWT40110.3 (nm) | 20 |
| A40110Mx | 0.577 |
| WA40110Mx (nm) | 700 |

11th Embodiment

The defined-wavelength light absorbing optical lens element of the 11th embodiment includes one defined-wavelength light absorbent IR23, and the defined-wavelength light absorbing optical lens element is made of COC/COP. The defined-wavelength light absorbing optical lens element has an average transmittance larger than 50% in all of a blue visible light region, a green visible light region and a red visible light region. The defined-wavelength light absorbing optical lens element has a low penetrated narrowband having a transmittance smaller than 70% in a wavelength range of 800 nm-1100 nm, the defined-wavelength light absorbing optical lens element has a low penetrated narrowband having a transmittance smaller than 50% in a wavelength range of 800 nm-1100 nm, and the defined-wavelength light absorbing optical lens element has a low penetrated narrowband having a transmittance smaller than 30% in a wavelength range of 800 nm-1100 nm. Furthermore, the defined-wavelength light absorbing optical lens element of the 11th embodiment can be disposed in the optical image lens assembly of the 1st embodiment to 2nd embodiment, and the details of the optical image lens assembly and the image capturing apparatus of the 1st embodiment to 2nd embodiment are shown in the aforementioned description and are not repeated again.

Table 13 shows detailed data of transmittance and absorbance at specific wavelengths of the defined-wavelength light absorbing optical lens element of the 11th embodiment, and the definition of T and A are the same as the 1st comparative embodiment and not be described again.

TABLE 13

| | Name |
|---|---|
| Defined-wavelength light absorbent | IR23 |
| Plastic material | COC/COP |

| Wavelength (nm) | T (%) | A |
|---|---|---|
| 350 | 36.5 | 0.437 |
| 360 | 41.2 | 0.385 |
| 370 | 44.7 | 0.349 |
| 380 | 48.5 | 0.314 |
| 390 | 53.9 | 0.268 |
| 400 | 62.3 | 0.205 |
| 410 | 70.5 | 0.152 |
| 420 | 74.4 | 0.129 |
| 430 | 76.9 | 0.114 |
| 440 | 78.6 | 0.105 |
| 450 | 79.0 | 0.102 |
| 460 | 79.5 | 0.100 |
| 470 | 79.4 | 0.100 |
| 480 | 79.9 | 0.098 |
| 490 | 80.6 | 0.094 |
| 500 | 81.7 | 0.088 |
| 510 | 82.4 | 0.084 |
| 520 | 82.7 | 0.082 |
| 530 | 83.3 | 0.079 |
| 540 | 84.3 | 0.074 |
| 550 | 85.0 | 0.070 |
| 560 | 85.5 | 0.068 |

TABLE 13-continued

| | | |
|---|---|---|
| 570 | 86.0 | 0.066 |
| 580 | 85.9 | 0.066 |
| 590 | 86.4 | 0.063 |
| 600 | 86.4 | 0.063 |
| 610 | 87.2 | 0.060 |
| 620 | 87.4 | 0.058 |
| 630 | 87.2 | 0.059 |
| 640 | 87.3 | 0.059 |
| 650 | 86.9 | 0.061 |
| 660 | 86.7 | 0.062 |
| 670 | 86.6 | 0.062 |
| 680 | 86.7 | 0.062 |
| 690 | 86.6 | 0.062 |
| 700 | 86.5 | 0.063 |
| 710 | 86.8 | 0.062 |
| 720 | 86.5 | 0.063 |
| 730 | 86.8 | 0.061 |
| 740 | 86.8 | 0.062 |
| 750 | 87.1 | 0.060 |
| 760 | 87.2 | 0.060 |
| 770 | 87.6 | 0.058 |
| 780 | 87.1 | 0.060 |
| 790 | 87.0 | 0.061 |
| 800 | 86.6 | 0.062 |
| 810 | 86.0 | 0.065 |
| 820 | 85.3 | 0.069 |
| 830 | 85.3 | 0.069 |
| 840 | 84.3 | 0.074 |
| 850 | 82.1 | 0.086 |
| 860 | 80.0 | 0.097 |
| 870 | 78.6 | 0.105 |
| 880 | 77.0 | 0.114 |
| 890 | 75.7 | 0.121 |
| 900 | 74.8 | 0.126 |
| 910 | 73.8 | 0.132 |
| 920 | 72.6 | 0.139 |
| 930 | 70.7 | 0.150 |
| 940 | 67.4 | 0.171 |
| 950 | 62.8 | 0.202 |
| 960 | 56.5 | 0.248 |
| 970 | 49.4 | 0.307 |
| 980 | 42.5 | 0.371 |
| 990 | 36.1 | 0.443 |
| 1000 | 29.1 | 0.536 |
| 1010 | 23.2 | 0.635 |
| 1020 | 22.3 | 0.652 |
| 1030 | 28.0 | 0.554 |
| 1040 | 38.7 | 0.412 |
| 1050 | 50.6 | 0.295 |
| 1060 | 61.3 | 0.212 |
| 1070 | 69.6 | 0.157 |
| 1080 | 76.2 | 0.118 |
| 1090 | 80.6 | 0.094 |
| 1100 | 83.8 | 0.077 |

Absorbance (A) = $-\text{LOG}_{10}$ (Transmittance)

The following parameters can be calculated from Table 13 as the following values and satisfy the following conditions, wherein the definition of BWT40110.7, BWT40110.5, BWT40110.3, A40110Mx and WA40110Mx are the same as the 7th embodiment and not be described again.

| 11th Embodiment | |
|---|---|
| BWT40110.7 (nm) | 140 |
| BWT40110.5 (nm) | 80 |
| BWT40110.3 (nm) | 40 |
| A40110Mx | 0.652 |
| WA40110Mx (nm) | 1020 |

The electronic devices of the following 12th embodiment to the 15th embodiment of the present disclosure are provided for further explanation.

12th Embodiment

Figure 3A:
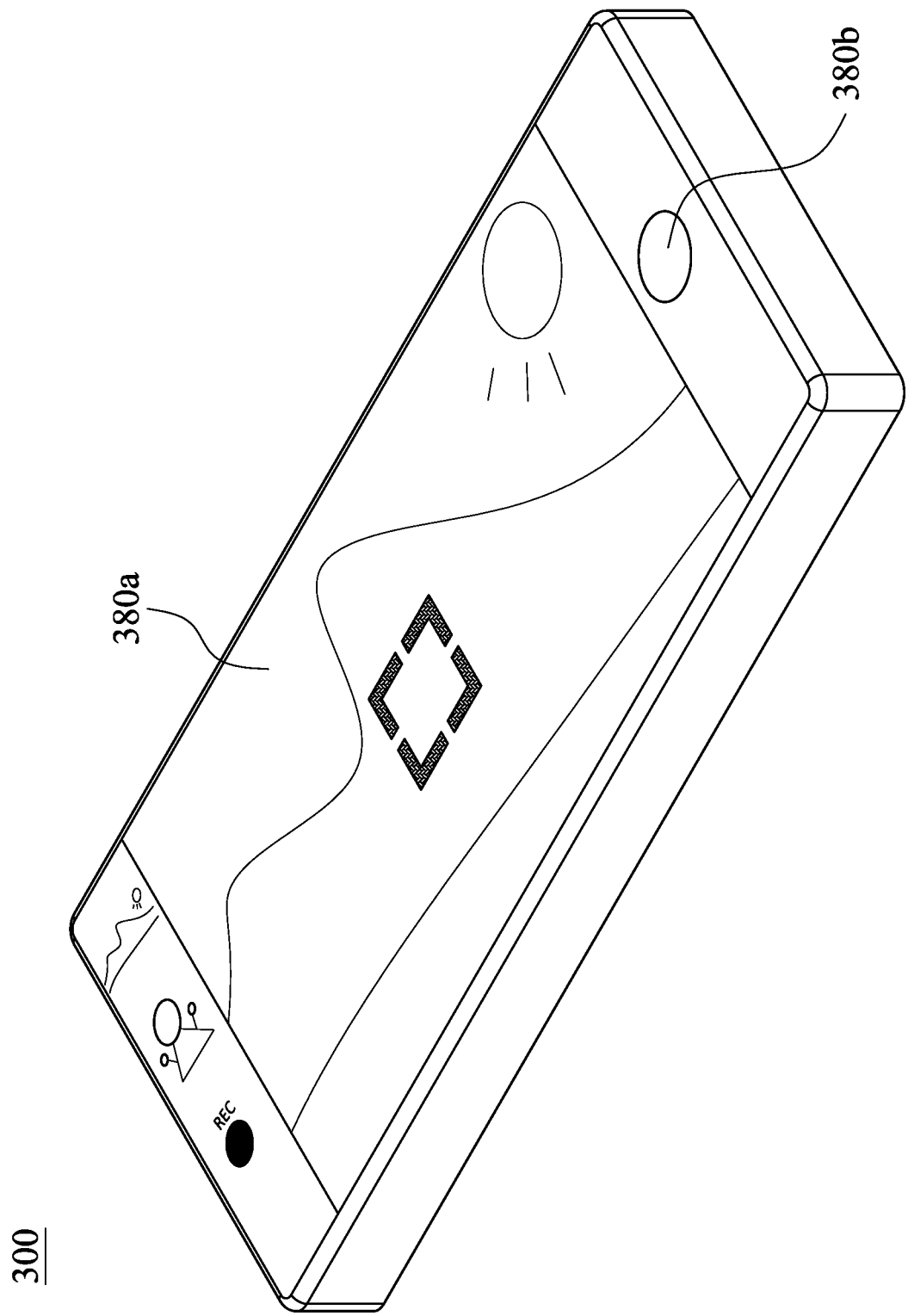
FIG. 3A is a schematic view of an electronic device according to the 12th embodiment of the present disclosure.
Figure 3B:
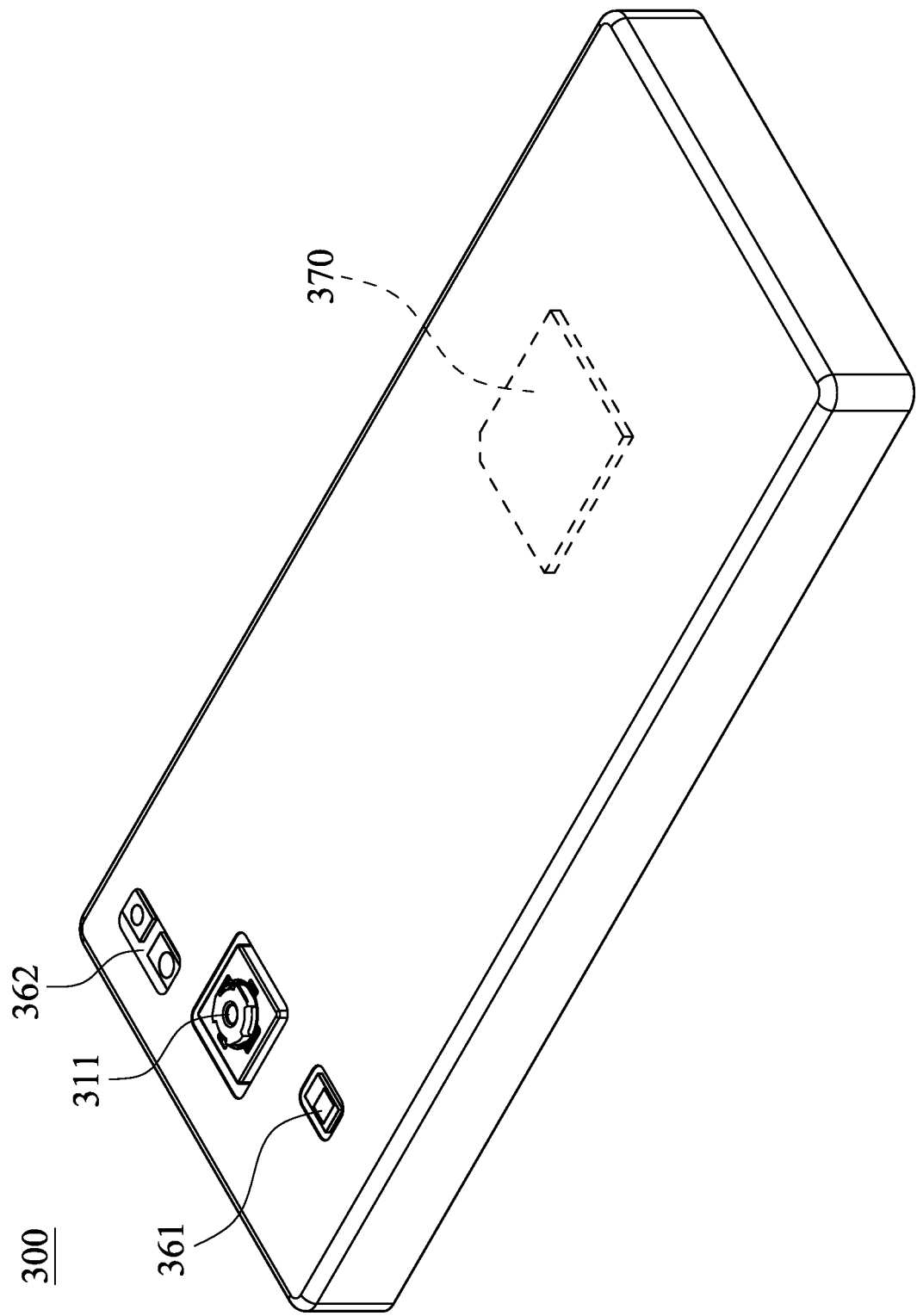
FIG. 3B is another schematic view of the electronic device according to the 12th embodiment of FIG. 3A.
Figure 3C:
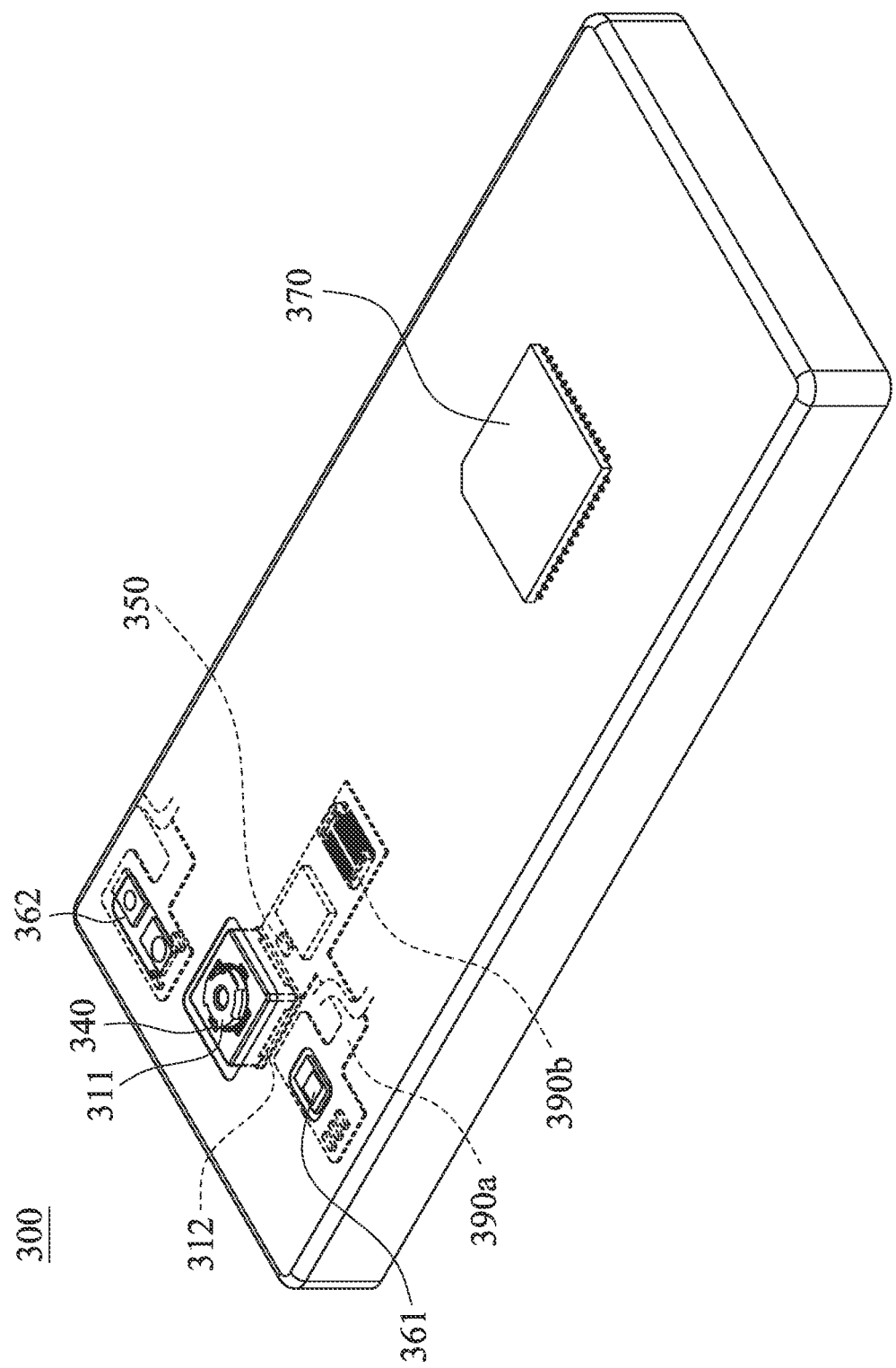
FIG. 3C is a schematic view of the elements of the electronic device according to the 12th embodiment of FIG. 3A.
Figure 3D:
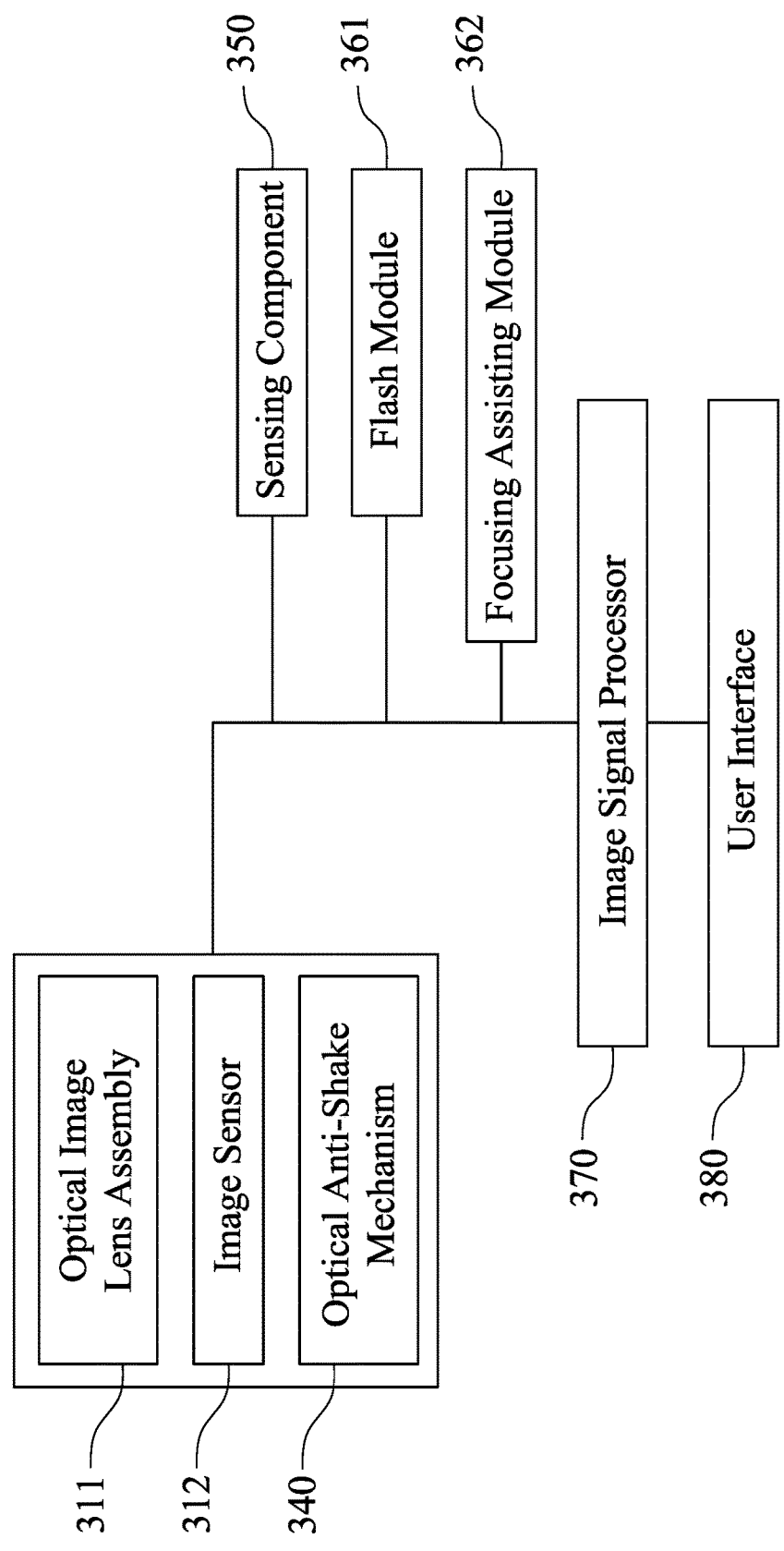
FIG. 3D is a block diagram of the electronic device according to the 12th embodiment of FIG. 3A.

FIG. 3A is a schematic view of an electronic device 300 according to the 12th embodiment of the present disclosure, FIG. 3B is another schematic view of the electronic device 300 according to the 12th embodiment of FIG. 3A, FIG. 3C is a schematic view of the elements of the electronic device 300 according to the 12th embodiment of FIG. 3A, and FIG. 3D is a block diagram of the electronic device 300 according to the 12th embodiment of FIG. 3A. As shown in FIG. 3A, FIG. 3B, FIG. 3C and FIG. 3D, the electronic device 300 of the 12th embodiment is a smart phone, and the electronic device 300 includes the image capturing apparatus (reference number is omitted) according to any one of the 1st embodiment and the 2nd embodiment of the present disclosure. The image capturing apparatus includes an optical image lens assembly 311 and an image sensor 312, wherein the image sensor 312 is disposed on the image surface (not shown) of the optical image lens assembly 311, and the optical image lens assembly 311 includes the defined-wavelength light absorbing optical lens element according to any one of the 3th embodiment to the 12th embodiment. Therefore, marketing demands for mass production and outward appearance of the electronic devices can be achieved.

Specifically, the user can activate the capturing mode by the user interface 380 of the electronic device 300, wherein the user interface 380 of the 12th embodiment can be a touch screen 380a, a button 380b, etc. At this moment, the optical image lens assembly 311 collects imaging light on the image sensor 312 and outputs electronic signals associated with images to an image signal processor (ISP) 370.

Furthermore, the electronic device 300 can further include an optical anti-shake mechanism 340, which can be an optical image stabilization device (OIS), in response to the camera specification of the electronic device 300. Moreover, the electronic device 300 can further include at least one auxiliary optical component (reference number is omitted) and at least one sensing component 350. In the 12th embodiment, the auxiliary optical component can be a flash module 361 and an autofocus assembly 362. The flash module 361 can be used for compensating the color temperature, and the autofocus assembly 362 can be an infrared distance measurement component or a laser focus module. The sensing component 350 can have functions for sensing physical momentum and kinetic energies, such as an accelerator, a gyroscope, and a hall effect element, so as to sense shaking or jitters applied by hands of the user or external environments. Thus, the autofocus function and the optical anti-shake mechanism 340 disposed on the electronic device 300 can function to obtain great image quality and facilitate the electronic device 300 according to the present disclosure to have a capturing function with multiple modes, such as taking optimized selfies, high dynamic range (HDR) with a low light source, 4K resolution recording, etc. Furthermore, the user can visually see the captured image of the camera through the touch screen and manually operate the view finding range on the touch screen to achieve the auto focus function of what you see is what you get.

Furthermore, as shown in FIG. 3C, the optical anti-shake mechanism 340, the sensing component 350, the flash module 361 and the autofocus assembly 362 can be disposed on a flexible printed circuit board (FPC) 390a and electrically connected with the associated elements, such as an image signal processor 370, via connector 390b so as to perform a capturing process. Because the current electronic devices, such as smart phone, have a tendency of being light and thin, the way of disposing the imaging lens assembly and related elements on the flexible printed circuit board and then integrating the circuit into the main board of the electronic device via the connector can satisfy the mechanical design of the limited space inside the electronic device and the layout requirements, and obtain more margins. The auto focus function of the imaging lens assembly 311 can be controlled more flexibly via the touch screen 380a of the electronic device 300. In other embodiments (not shown), the image sensor and the auxiliary optical component can also be disposed on the main board of the electronic device or carrier boards in other forms according to requirements of the mechanical design and the circuit layout.

Moreover, the electronic device 300 can further include, but not be limited to, a display, a control unit, a storage unit, a random-access memory (RAM), a read-only memory (ROM), or the combination thereof.

13th Embodiment

Figure 4:
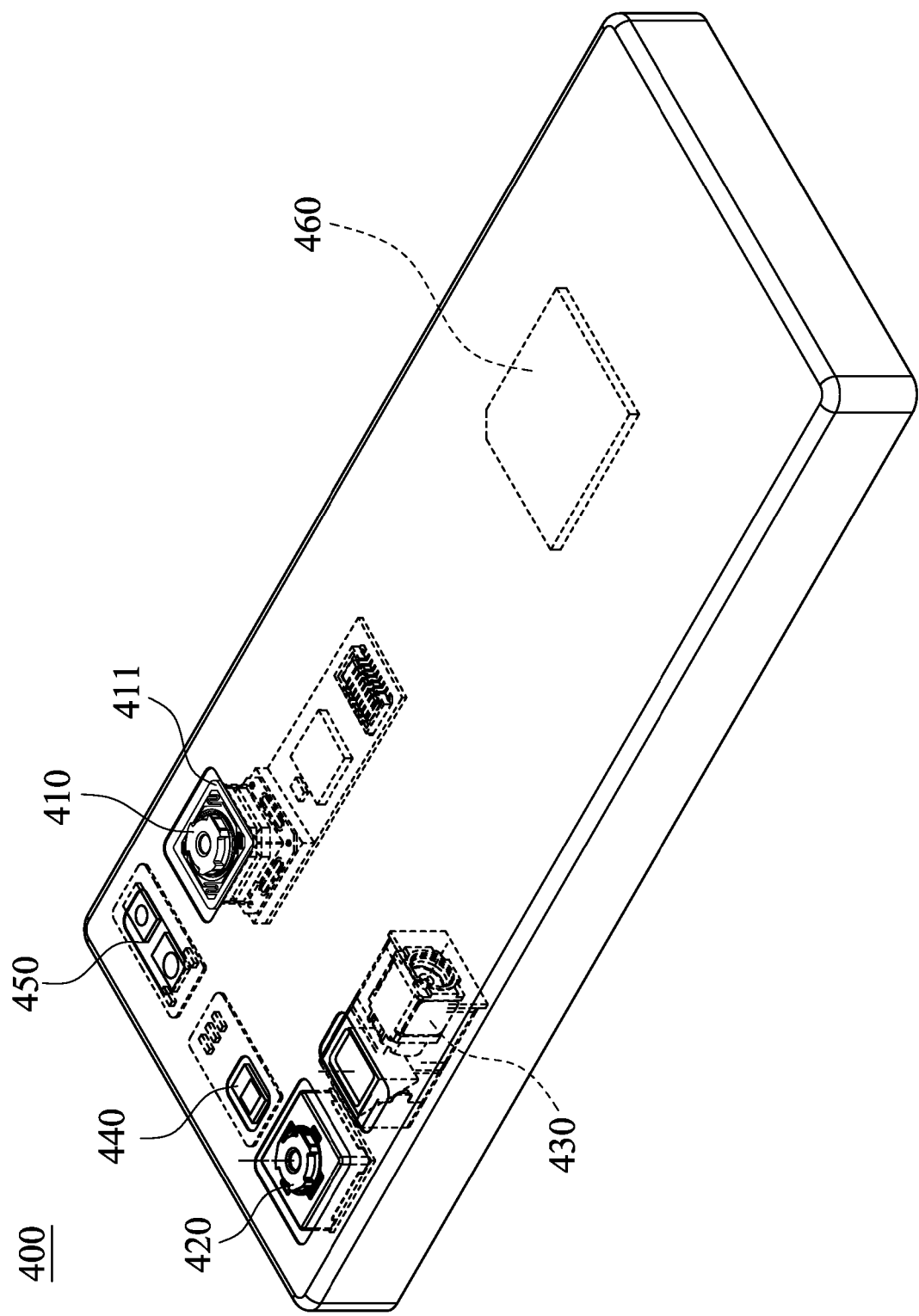
FIG. 4 is a schematic view of an electronic device according to the 13th embodiment of the present disclosure.

FIG. 4 is a schematic view of an electronic device 400 according to the 13th embodiment of the present disclosure. As shown in FIG. 4, the electronic device 400 includes three optical image lens assemblies, that are an optical image lens assembly 410, an optical image lens assembly 420 and an optical image lens assembly 430, a flash module 440, an autofocus assembly 450, an image signal processor 460, a user interface (not shown) and an image software processor (not shown), wherein all of the optical image lens assembly 410, the optical image lens assembly 420 and the optical image lens assembly 430 are facing toward the same side (that is, the object side thereof). When the user captures images of an imaged object via the user interface, the electronic device 400 focuses and generates an image via the optical image lens assembly 410, the optical image lens assembly 420 and the optical image lens assembly 430 while compensating for low illumination via the flash module 440 when necessary. Then, the electronic device 400 quickly focuses on the imaged object according to its object distance information provided by the autofocus assembly 450, and optimizes the image via the image signal processor 460 and the image software processor. Thus, the image quality of the optical image lens assembly 410, the optical image lens assembly 420 and the optical image lens assembly 430 can be further enhanced. The autofocus assembly 450 can adopt conventional infrared or laser for obtaining quick focusing, and the user interface can utilize a touch screen or a physical button for capturing and processing the image with various functions of the image processing software.

In the 13 embodiment, the optical image lens assembly 410, the optical image lens assembly 420 and the optical image lens assembly 430 can be any one according to the 1st embodiment and the 2nd embodiment of the present disclosure, the optical image lens assembly 410, the optical image lens assembly 420 and the optical image lens assembly 430 can include the defined-wavelength light absorbing optical lens element according to any one of the 3th embodiment to the 12th embodiment, and the present disclosure is not limited thereto.

14th Embodiment

Figure 5:
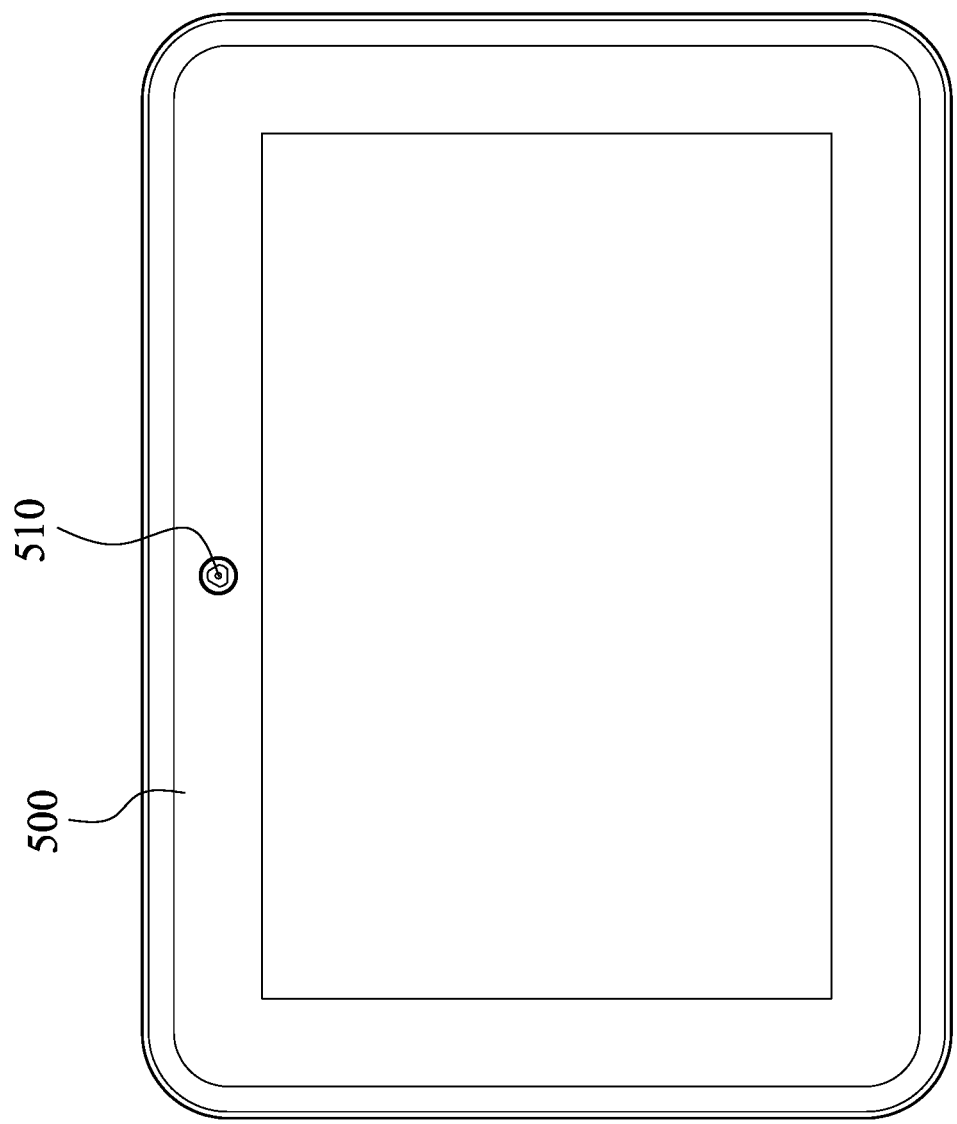
FIG. 5 is a schematic view of an electronic device according to the 14th embodiment of the present disclosure.

FIG. 5 is a schematic view of an electronic device 500 according to the 14th embodiment of the present disclosure. The electronic device 500 of the 14th embodiment is a tablet, and the electronic device 500 includes an image capturing apparatus 510. The image capturing apparatus 510 includes the optical image lens assembly according to the present disclosure (not shown) and an image sensor (not shown), wherein the image sensor is disposed on the image plane of the optical image lens assembly.

15th Embodiment

Figure 6:
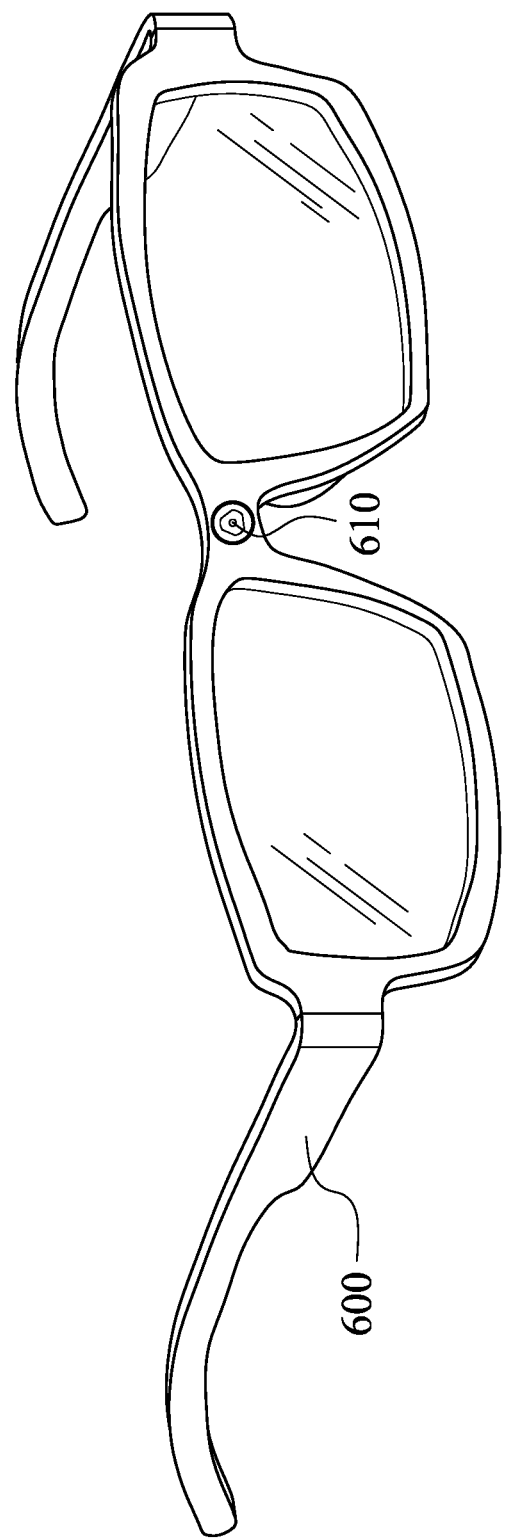
FIG. 6 is a schematic view of an electronic device according to the 15th embodiment of the present disclosure.

FIG. 6 is a schematic view of an electronic device 600 according to the 15th embodiment of the present disclosure. The electronic device 600 of the 15th embodiment is a wearable device, and the electronic device 600 includes an image capturing apparatus 610. The image capturing apparatus 610 includes the optical image lens assembly according to the present disclosure (not shown) and an image sensor (not shown), wherein the image sensor is disposed on the image plane of the optical image lens assembly.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:
1. An optical image lens assembly, comprising:
   a plurality of optical lens elements comprising a plurality of plastic optical lens elements having refractive power and aspheric surfaces;
   wherein the plastic optical lens elements are formed by an injection molding method and comprise at least one defined-wavelength light absorbing optical lens element, and the defined-wavelength light absorbing optical lens element comprises at least one defined-wavelength light absorbent;
   wherein the defined-wavelength light absorbing optical lens element has an average transmittance larger than 50% in a green visible light region, and the defined-wavelength light absorbing optical lens element has an average transmittance smaller than 50% in a defined-wavelength region;
   wherein a transmitted distance of a chief ray passing through the defined-wavelength light absorbing optical lens element between a central field of view to a field of view in 1.0 region in an imaging region of the optical image lens assembly is CP, a transmitted distance of the chief ray passing through the defined-wavelength light absorbing optical lens element in the central field of the optical image lens assembly is CP0, and the following condition is satisfied:

$$0.5 \leq CP/CP0 \leq 2.0.$$

2. The optical image lens assembly of claim 1, wherein the defined-wavelength light absorbing optical lens element is made of a thermoplastic material, an average transmittance in a wavelength range of 380 nm-430 nm of all of the defined-wavelength light absorbing optical lens elements is T3843, an average transmittance in a wavelength range of 520 nm-570 nm of all of the defined-wavelength light absorbing optical lens elements is T5257, and the following conditions are satisfied:

$T3843 \leq 50\%$; and $T5257 \geq 85\%$.

3. The optical image lens assembly of claim 2, wherein an Abbe number of the defined-wavelength light absorbing optical lens element is V, and the following condition is satisfied:

$50.0 \leq V$.

4. The optical image lens assembly of claim 1, wherein the transmitted distance of the chief ray passing through the defined-wavelength light absorbing optical lens element between the central field of view to the field of view in 1.0 region in the imaging region of the optical image lens assembly is CP, the transmitted distance of the chief ray passing through the defined-wavelength light absorbing optical lens element in the central field of the optical image lens assembly is CP0, and the following condition is satisfied:

$0.8 \leq CP/CP0 \leq 1.2$.

5. The optical image lens assembly of claim 4, wherein the defined-wavelength light absorbing optical lens element is made of a thermoplastic material, an average transmittance in a wavelength range of 380 nm-430 nm of all of the defined-wavelength light absorbing optical lens elements is T3843, an average transmittance in a wavelength range of 520 nm-570 nm of all of the defined-wavelength light absorbing optical lens elements is T5257, and the following conditions are satisfied:

$T3843 \leq 50\%$; and $T5257 \geq 85\%$.

6. The optical image lens assembly of claim 5, wherein an Abbe number of the defined-wavelength light absorbing optical lens element is V, and the following condition is satisfied:

$50.0 \leq V$.

7. The optical image lens assembly of claim 6, wherein a wavelength having a 50% transmittance and an increasing trend in a wavelength range of 300 nm-500 nm of the defined-wavelength light absorbing optical lens element is SWuT50, and the following condition is satisfied:

$400 \text{ nm} \leq SWuT50$.

8. The optical image lens assembly of claim 6, wherein a maximum absorbance in a wavelength range of 300 nm-500 nm of the defined-wavelength light absorbing optical lens element is A3050Mx, a minimum absorbance in a wavelength range of 400 nm-700 nm of the defined-wavelength light absorbing optical lens element is A4070Mn, and the following condition is satisfied:

$A3050Mx/A4070Mn \geq 30$.

9. The optical image lens assembly of claim 6, wherein a bandwidth having an absorbance larger than 2.0 in a wavelength range of 300 nm-450 nm of the defined-wavelength light absorbing optical lens element is BWA3045.2, and the following condition is satisfied:

$BWA3045.2 \geq 30 \text{ nm}$.

10. The optical image lens assembly of claim 6, wherein a wavelength having a maximum absorbance in a wavelength range of 300 nm-500 nm of the defined-wavelength light absorbing optical lens element is WA3050Mx, and the following condition is satisfied:

$300 \text{ nm} \leq WA3050Mx \leq 420 \text{ nm}$.

11. An image capturing apparatus, comprising:
the optical image lens assembly of claim 1; and
an image sensor disposed on an image plane of the optical image lens assembly.

12. An electronic device, which is a mobile device, comprising:
the image capturing apparatus of claim 11.

13. An optical image lens assembly, comprising:
a plurality of optical lens elements comprising a plurality of plastic optical lens elements having refractive power and aspheric surfaces;
wherein the plastic optical lens elements are formed by an injection molding method and comprise at least one defined-wavelength light absorbing optical lens element, and the defined-wavelength light absorbing optical lens element comprises at least one defined-wavelength light absorbent;
wherein the defined-wavelength light absorbing optical lens element has an average transmittance larger than 50% in at least one of a blue visible light region, a green visible light region and a red visible light region;
wherein the defined-wavelength light absorbing optical lens element has an average transmittance smaller than 70% in a defined-wavelength region, and a bandwidth having a transmittance smaller than 70% of the defined-wavelength light absorbing optical lens element is smaller than 200 nm;
wherein a transmitted distance of a chief ray passing through the defined-wavelength light absorbing optical lens element between a central field of view to a field of view in 1.0 region in an imaging region of the optical image lens assembly is CP, a transmitted distance of the chief ray passing through the defined-wavelength light absorbing optical lens element in the central field of the optical image lens assembly is CP0, and the following condition is satisfied:

$0.8 \leq CP/CP0 \leq 1.2$.

14. The optical image lens assembly of claim 13, wherein a bandwidth having a transmittance smaller than 70% in a wavelength range of 400 nm-1100 nm of the defined-wavelength light absorbing optical lens element is BWT40110.7, and the following condition is satisfied:

$10 \text{ nm} \leq BWT40110.7 \leq 200 \text{ nm}$.

15. The optical image lens assembly of claim 14, wherein an Abbe number of the defined-wavelength light absorbing optical lens element is V, and the following condition is satisfied:

$50.0 \leq V$.

16. The optical image lens assembly of claim 15, wherein a bandwidth having a transmittance smaller than 50% in a wavelength range of 400 nm-1100 nm of the defined-wavelength light absorbing optical lens element is BWT40110.5, and the following condition is satisfied:

$0 \text{ nm} < BWT40110.5 \leq 100 \text{ nm}$.

17. The optical image lens assembly of claim 16, wherein a bandwidth having a transmittance smaller than 30% in a wavelength range of 400 nm-1100 nm of the defined-wavelength light absorbing optical lens element is BWT40110.3, and the following condition is satisfied:

$0 \text{ nm} < BWT40110.3 \leq 80 \text{ nm}$.

18. The optical image lens assembly of claim 16, wherein the defined-wavelength light absorbing optical lens element has a low penetrated narrowband having a transmittance smaller than 50% in a wavelength range of 600 nm-900 nm.

19. The optical image lens assembly of claim 17, wherein the defined-wavelength light absorbing optical lens element has a low penetrated narrowband having a transmittance smaller than 30% in a wavelength range of 800 nm-1100 nm.

20. The optical image lens assembly of claim 14, wherein an Abbe number of the defined-wavelength light absorbing optical lens element is V, and the following condition is satisfied:

$$V \leq 50.0.$$

21. The optical image lens assembly of claim 20, wherein a bandwidth having a transmittance smaller than 50% in a wavelength range of 400 nm-1100 nm of the defined-wavelength light absorbing optical lens element is BWT40110.5, and the following condition is satisfied:

$$0 \text{ nm} < BWT40110.5 \leq 100 \text{ nm}.$$

22. The optical image lens assembly of claim 20, wherein the defined-wavelength light absorbing optical lens element has a low penetrated narrowband having a transmittance smaller than 70% in a wavelength range of 400 nm-700 nm.

23. An image capturing apparatus, comprising:
   the optical image lens assembly of claim 13; and
   an image sensor disposed on an image plane of the optical image lens assembly.

24. An electronic device, which is a mobile device, comprising:
   the image capturing apparatus of claim 23.

* * * * *